US012767760B2

(12) United States Patent
Shin et al.

(10) Patent No.: US 12,767,760 B2
(45) Date of Patent: Oct. 20, 2026

(54) MULTIBLOCK COPOLYMER CONTAINING POLYLACTIC ACID AND POLYAMIDE FOR TOUGHENING POLYLACTIC ACID AND METHOD FOR PREPARING THE SAME

(71) Applicant: KOREA RESEARCH INSTITUTE OF CHEMICAL TECHNOLOGY, Daejeon (KR)

(72) Inventors: Jihoon Shin, Daejeon (KR); Sae Hume Park, Daejeon (KR); Seungju Hong, Daejeon (KR)

(73) Assignee: KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 573 days.

(21) Appl. No.: 18/238,600

(22) Filed: Aug. 28, 2023

(65) Prior Publication Data

US 2024/0174807 A1 May 30, 2024

(30) Foreign Application Priority Data

Nov. 15, 2022 (KR) ........................ 10-2022-0152851

(51) Int. Cl.
*C08G 69/44* (2006.01)

(52) U.S. Cl.
CPC .................................... *C08G 69/44* (2013.01)

(58) Field of Classification Search
CPC ...................................................... C08G 69/44
See application file for complete search history.

(56) References Cited

FOREIGN PATENT DOCUMENTS

KR 102306907 9/2021

OTHER PUBLICATIONS

Seung-Ju Hong et al., "Semicrystalline-Glassy Multiblock Copolymers via Mechanochemical Synthesis toward Tough Poly(lactide)," ACS Sustainable Chemistry & Engineering, vol. 10, No. 44, pp. 14523-14538, Oct. 2022, doi: https://doi.org/10.1021/acssuschemeng.2c04236.

*Primary Examiner* — Ana L. Woodward
(74) *Attorney, Agent, or Firm* — LEX IP MEISTER, PLLC

(57) ABSTRACT

Provided are a multiblock copolymer containing polylactide and polyamide for toughening polylactide and a method for preparing the same, wherein the multiblock copolymer containing polylactide and polyamide has an effect of overcoming the brittleness and providing a toughened polylactide-containing copolymer.

13 Claims, 10 Drawing Sheets

MULTIBLOCK COPOLYMER CONTAINING POLYLACTIC ACID AND POLYAMIDE FOR TOUGHENING POLYLACTIC ACID AND METHOD FOR PREPARING THE SAME

CROSS-REFERENCE TO RELATED APPLICATION

This application claims priority to Korean Patent Application No. 10-2022-0152851 filed on Nov. 15, 2022, and all the benefits accruing therefrom under 35 U.S.C. § 119, the contents of which is incorporated by reference in its entirety.

BACKGROUND OF THE INVENTION

1. Field of the Invention

The present invention relates to a multiblock copolymer containing polylactic acid and polyamide for toughening polylactic acid and a method for preparing the same.

2. Description of the Related Art

Recently, in order to solve problems such as global warming and secure sustainable growth, many studies are being actively conducted to reduce greenhouse gases and replace petrochemical raw materials. As a solution thereof, since biomass-derived monomer polymerized bioplastics have similar physical properties and application fields to existing plastics, the bioplastics have easy market entry during development, so that its commercialization potential is higher than any other bioplastic.

Among these bioplastics, polylactide (PLA) is repolymerized using lactide depolymerized from oligomeric polylactic acid initially polymerized by lactic acid converted from glucose through a fermentation process. Among brittle general polymers, polylactide (PLA) is generally recognized as one of the most promising plastics to replace petrochemical-based polymers, such as polystyrene (PS) for injection molding and polypropylene (PP) for fiber extrusion, due to bioperformance including high yield stress of 50 to 60 MPa due to the presence of ester linkages in PLA, and compatibility and degradability for end-user industries based on thermoplastic processing and packaging, biomedics, textiles, and transportation.

However, despite the advantages for commercial plastics, the inherent brittleness of PLA has poor toughness of 8 to 9 MJ $m^{-3}$ and an elongation at break of less than 10%, and limits the use of ductility that requires plastic deformation at increased stress and flexibility at increased strain.

There have been extensive efforts in academia and industry to overcome such brittleness and expand the application range of PLA. These efforts may be divided into two main strategies: a single-phase based approach for achieving a plasticizing effect by introducing plasticizers that are fully mixed with PLA, and a micro/nano phase separation method for improving toughening behavior by preparing a physically and chemically mixed PLA system or block copolymer.

Sustainable organic small molecules with molar masses of <1000 g $mol^{-1}$ such as lactide-derived ester oligomers, tartaric acid esters, levulinic acid esters, ethoxylated esters from waste frying oil, and ferulic acid esters have recently been reported and used as plasticizers. The sustainable organic small molecules induced a single-phase system with improved PLA flexibility having a reduced E value of 1299-11 MPa, an $\sigma$ yield value of 74-7 MPa, and an increased & value of 243-658% compared to original PLA.

In contrast, a PLA enrichment scheme driven by phase separation, and micrometer-scale phase separation is generally involved with a polymer mixing system that physically combines PLA and its immiscible counterparts with the following materials: 1) a non-reactive compatibilizer located at an interface between two components to lower an interfacial tension, or 2) a chemically reactive compatibilizer having a functional group such as epoxy, carboxylic acid, and thiol-ene to covalently link an incompatible polymer with PLA and exhibit a large increase in fracture (toughness) in a tensile strain-stress curve.

Another method for reinforcing PLA may synthesize polymer structures such as diblocks, triblocks, terpolymers and graft copolymers, which are repeating block units consisting of PLA as a major part and an immiscible polymer that provides ductility, which may also be achieved with nano-scale phase separation. In particular, a multiblock copolymer derived from an ABA triblock in which a soft (or rubbery) B phase is cross-linked to a hard A phase (PLA or PLLA block) exhibits improved mechanical properties, including elastomer and toughening performance. However, these PLA multiblock copolymers have a disadvantage in that yield stress and Young's modulus are lower than those of commercially available PLA homopolymers.

SUMMARY OF THE INVENTION

An object of the present invention is to overcome the brittleness of PLA used as bioplastic and provide improved toughening.

Another object of the present invention is to provide a copolymer including PLA for toughening PLA and a method for preparing the same.

The objects to be solved by the present invention are not limited to the aforementioned object(s), and other object(s), which are not mentioned above, will be apparent to those skilled in the art from the following description.

For the object of the present invention described above, the present inventors prepared a polyamide 11-polylactide multiblock copolymer by preparing polyamide 11 having a diamine end group by copolymerizing 11-amino undecanoic acid derivatives derived from vegetable oil in the presence f a small amount of diamine, preparing hydroxyl telechelic polylactide-polyamide 11-polylactide by ring-opening polymerization of lactide with the polyamide 11, and then preparing polyamide 11-polylactide multiblock copolymer by urethane bonding of diisocyanate to the polylactide-polyamide 11-polylactide. It is developed a multiblock copolymer containing PLA and PA for toughening PLA by confirming that the polyamide 11-polylactide multiblock copolymer prepared as described above solved a problem of brittleness of PLA and significantly improved toughness.

According to the present invention, the multiblock copolymer containing PLA and PA has a significantly improved toughening effect compared to PLA.

In addition, the multiblock copolymer containing PLA and PA has an effect of having a bio-carbon content of 97% or more.

In addition, the method for preparing the multiblock copolymer containing PLA and PA has an eco-friendly effect without using a solvent.

It should be understood that the effects of the present invention are not limited to the effects, but include all effects that can be deduced from the detailed description of the present invention or configurations of the present invention described in appended claims.

DETAILED DESCRIPTION OF THE INVENTION

Figure 1:
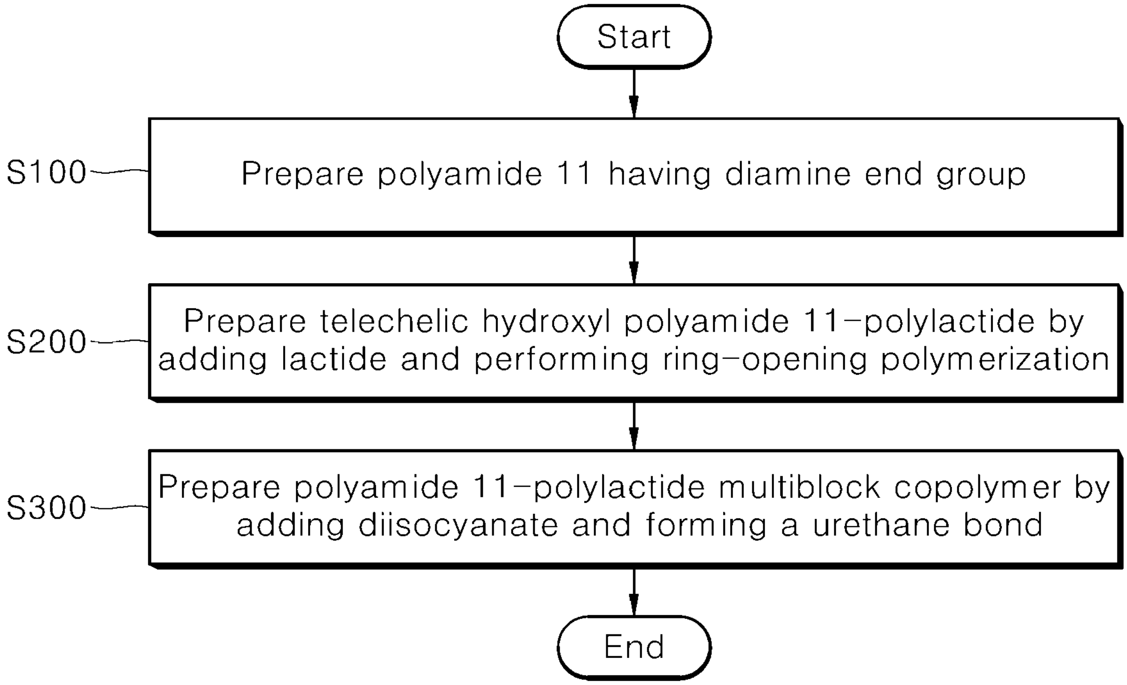
FIG. 1 illustrates a process flowchart of a method for preparing a polyamide 11-polylactide multiblock copolymer according to an embodiment of the present invention.

Before describing the present invention in detail, terms or words used in this specification should not be construed as unconditionally limited to a conventional or dictionary meaning, and the inventors of the present invention can appropriately define and use the concept of various terms in order to describe their invention in the best method. Furthermore, it should be understood that these terms or words should be interpreted as meanings and concepts consistent with the technical idea of the present invention.

That is, the terms used in the present invention are only used to describe a preferred embodiment of the present invention, and are not intended to specifically limit the contents of the present invention, and it should be noted that these terms are terms defined in consideration with various possibilities of the present invention.

In addition, in this specification, it should be understood that the singular expression may include a plural expression unless clearly indicated in another meaning in the context, and even if similarly expressed in the plural, the singular expression may include the meaning of the singular number.

Throughout the present invention, when a component is described as "including" the other component, the component does not exclude any other component, but may further include any other component unless otherwise indicated in contrary.

Further, hereinafter, in the following description of the present invention, a detailed description of a configuration determined to unnecessarily obscure the subject matter of the present invention, for example, known technologies including the related arts may be omitted.

Hereinafter, the present invention will be described in more detail.

The present invention provides a method for preparing a polyamide 11-polylactide multiblock copolymer as a multiblock copolymer containing PLA and PA for toughening PLA.

The polyamide 11-polylactide multiblock copolymer according to the present invention may be prepared by including (a) preparing polyamide 11 [$NH_2$-PA11-$NH_2$] having a diamine end group; (b) preparing hydroxyl telechelic polylactide-polyamide 11-polylactide [OH-PLA-PA11-PLA-OH] by adding lactide to the polyamide 11 [$NH_2$-PA11-$NH_2$] having the diamine end group and performing ring-opening polymerization; and (c) preparing a polyamide 11-polylactide multiblock copolymer [(PA11-PLA)$_n$, wherein n is an integer or prime number of 1 to 10] by adding diisocyanate to the hydroxyl telechelic polylactide-polyamide 11-polylactide [OH-PLA-PA11-PLA-OH] and forming a urethane bond.

The method for preparing the polyamide 11-polylactide multiblock copolymer according to the present invention was shown in FIG. 10 below and will be described in detail below with reference to FIG. 10.

(a) Preparing polyamide 11 [$NH_2$-PA11-$NH_2$] having diamine end group

The polyamide 11 [$NH_2$-PA11-$NH_2$] having the diamine end group may be prepared by polycondensation of an 11-amino undecanoic acid derivative of Formula 2 below and diamine of Formula 3 below.

[Formula 2]

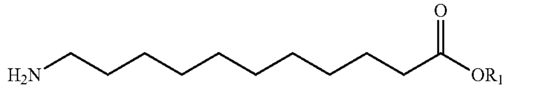

In Formula 2, $R_1$ is selected from H or a C1-C10 straight-chain, branched-chain or cyclic alkyl group, or a C6-C10 aryl group or a C7-C10 aralkyl group.

[Formula 3]

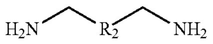

In Formula 3, $R_2$ is selected from C1-C20 straight-chain or branched-chain alkylene, C3-C20 cycloalkylene, C6-C20 arylene,

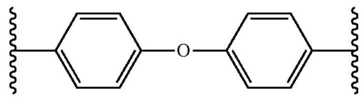

or

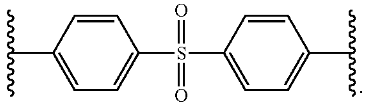

The polyamide 11 [$NH_2$-PA11-$NH_2$] having the diamine end group may be represented by Formula 4 below.

[Formula 4]

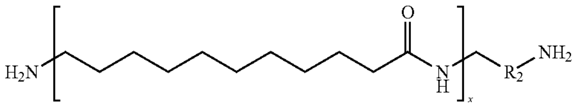

In Formula 4, $R_2$ is selected from C1-C20 straight-chain or branched-chain alkylene, C3-C20 cycloalkylene, C6-C20 arylene,

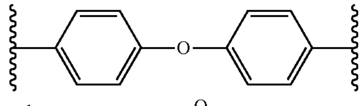

or

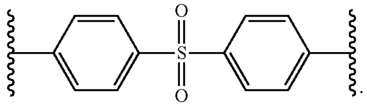

and x is an integer of 1 to 200.

Figure 10:
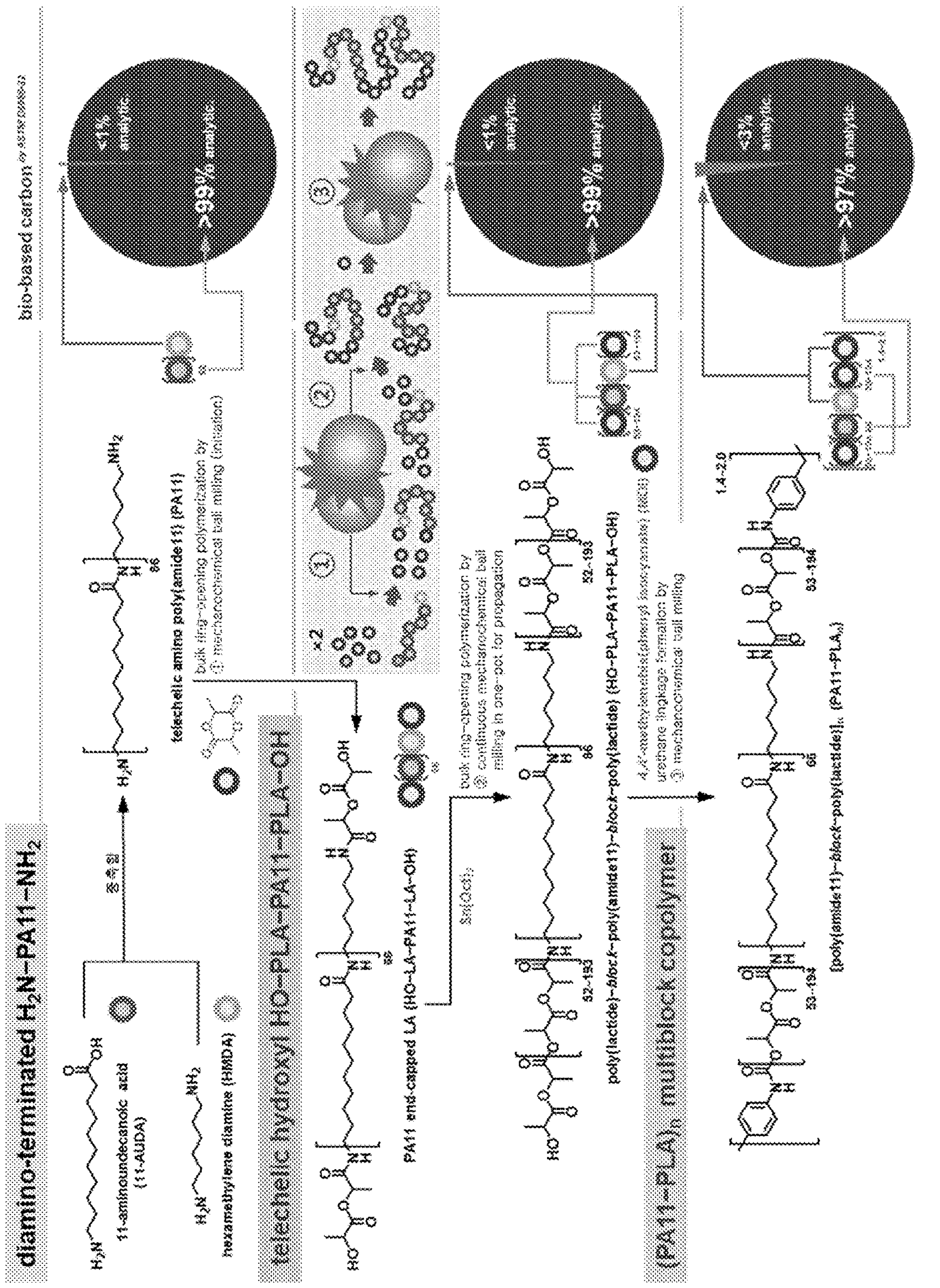
FIG. 10 illustrates a schematic process for preparing a polyamide 11-polylactide multiblock copolymer through mechanochemical synthesis according to one embodiment of the present invention.

(b) Preparing hydroxyl telechelic polylactide-polyamide 11-polylactide [OH-PLA-PA11-PLA-OH] by adding lactide to the polyamide-11 [$NH_2$-PA11-$NH_2$] having the diamine end group and performing ring-opening polymerization (including step ①, step ② in FIG. 10)

In step (b), (b-1) lactide may be added to the polyamide 11 [$NH_2$-PA11-$NH_2$] having the diamine end group and subjected to ring-opening polymerization to form hydroxyl telechelic lactide-polyamide 11-lactide [OH-LA-PA11-LA-OH] (step ① in FIG. 10), and (b-2) lactide may be continuously subjected to ring-opening polymerization to prepare hydroxyl telechelic polylactide-polyamide 11-polylactide [OH-PLA-PA11-PLA-OH] (step ② in FIG. 10).

The hydroxyl telechelic polylactide-polyamide 11-polylactide [OH-PLA-PA11-PLA-OH] may be represented by Formula 5 below.

[Formula 5]

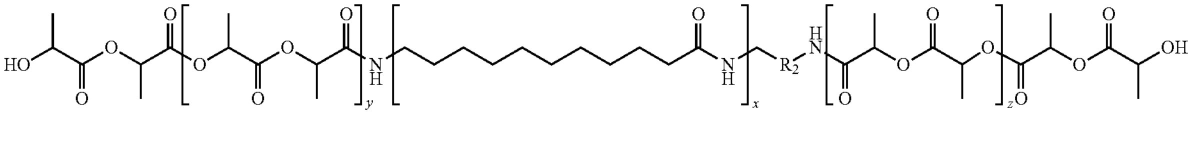

In Formula 5, $R_2$ is selected from C1-C20 straight-chain or branched-chain alkylene, C3-C20 cycloalkylene, C6-C20 arylene,

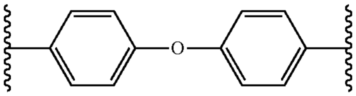

or

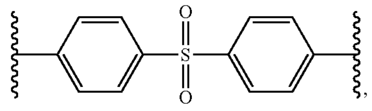

x is an integer of 1 to 200, and y and z are the same as or different from each other and are integers of 1 to 500.

The ring-opening polymerization in steps (b-1) and (b-2) may be performed by a mechanochemical method. Preferably, the ring-opening polymerization may be performed by a ball milling method, but is not limited thereto.

In step (b-2), $Sn(Oct)_2$ may be used as a catalyst.

The lactide may be D-lactide or L-lactide.

(c) Preparing polyamide 11-polylactide multiblock copolymer [$(PA11\text{-}PLA)_n$, wherein n is an integer or prime number of 1 to 10] by adding diisocyanate to the hydroxyl telechelic polylactide-polyamide 11-polylactide [OH-PLA-PA11-PLA-OH] and forming a urethane bond (step ③ of FIG. 10)

The diisocyanate may be represented by Formula 6 below.

[Formula 6]

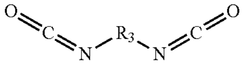

In Formula 6, $R_3$ is selected from C1-C20 straight-chain or branched-chain alkylene, C3-C20 cycloalkylene, and C6-C20 arylene.

The forming of the urethane bond in step (c) may be performed by a mechanochemical method. Preferably, the forming of the urethane bond may be performed by a ball milling method, but is not limited thereto.

The present invention provides a polyamide 11-polylactide multiblock copolymer represented by Formula 1 below as a multiblock copolymer containing PLA and PA for toughening PLA.

[Formula 1]

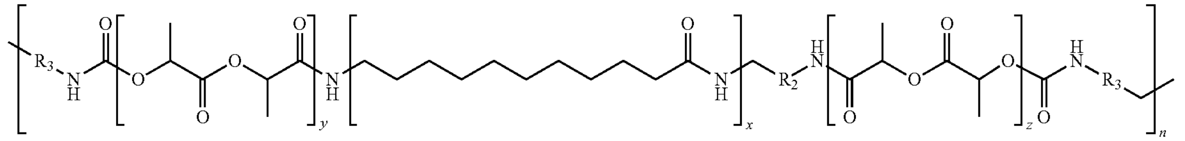

In Formula 1, $R_2$ is selected from C1-C20 straight-chain or branched-chain alkylene, C3-C20 cycloalkylene, C6-C20 arylene,

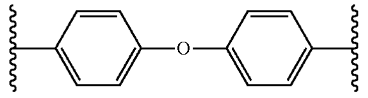

or

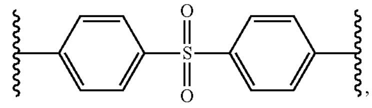

, $R_3$ is selected from C1-C20 straight-chain or branched-chain alkylene, C3-C20 cycloalkylene, or C6-C20 arylene, x is an integer of 1 to 200, y and z are the same as or different from each other and integers of 1 to 500, and n is an integer or a prime number of 1 to 10.

The polyamide 11-polylactide multiblock copolymer according to the present invention may be prepared by the above-described preparing method. Specifically, the polyamide 11-polylactide multiblock copolymer may be prepared by urethane bonding of diisocyanate to the hydroxyl telechelic polylactide-polyamide 11-polylactide [OH-PLA-PA11-PLA-OH] prepared by ring-opening polymerization of lactide with the polyamide 11 [$NH_2$-PA11-$NH_2$] having the diamine end group. The preparing process for each step duplicates with the method for preparing the aforementioned polyamide 11-polylactide multiblock copolymer and thus will be omitted.

The method for preparing the polyamide 11-polylactide multiblock copolymer according to the present invention may be performed only by a mechanochemical method without using an organic solvent harmful to the human body or the environment.

The polyamide 11-polylactide multiblock copolymer according to the present invention has a very high bio-based carbon content, and the bio-based carbon content may be 90% or more, preferably 95% or more, and more preferably 97% or more.

The polyamide 11-polylactide multiblock copolymer according to the present invention may include 30 to 90 vol % of polylactide and 5 to 70 vol % of polyamide 11 having the diamine end group. In the present invention, four types of polyamide 11-polylactide multiblock copolymers containing 50, 60, 70, and 80 vol % of polylactide were prepared and their mechanical properties were confirmed.

Specifically, the polyamide 11-polylactide multiblock copolymer according to the present invention has Young's modulus (E=758-903 MPa), yield stress ($\sigma_{yield}$=57-63 MPa), elongation ($\varepsilon_b$=380-493%) and toughness ($\gamma$=124-171 MJ $m^{-3}$), and exhibits excellent mechanical properties compared to commercial PLA.

Figure 9:
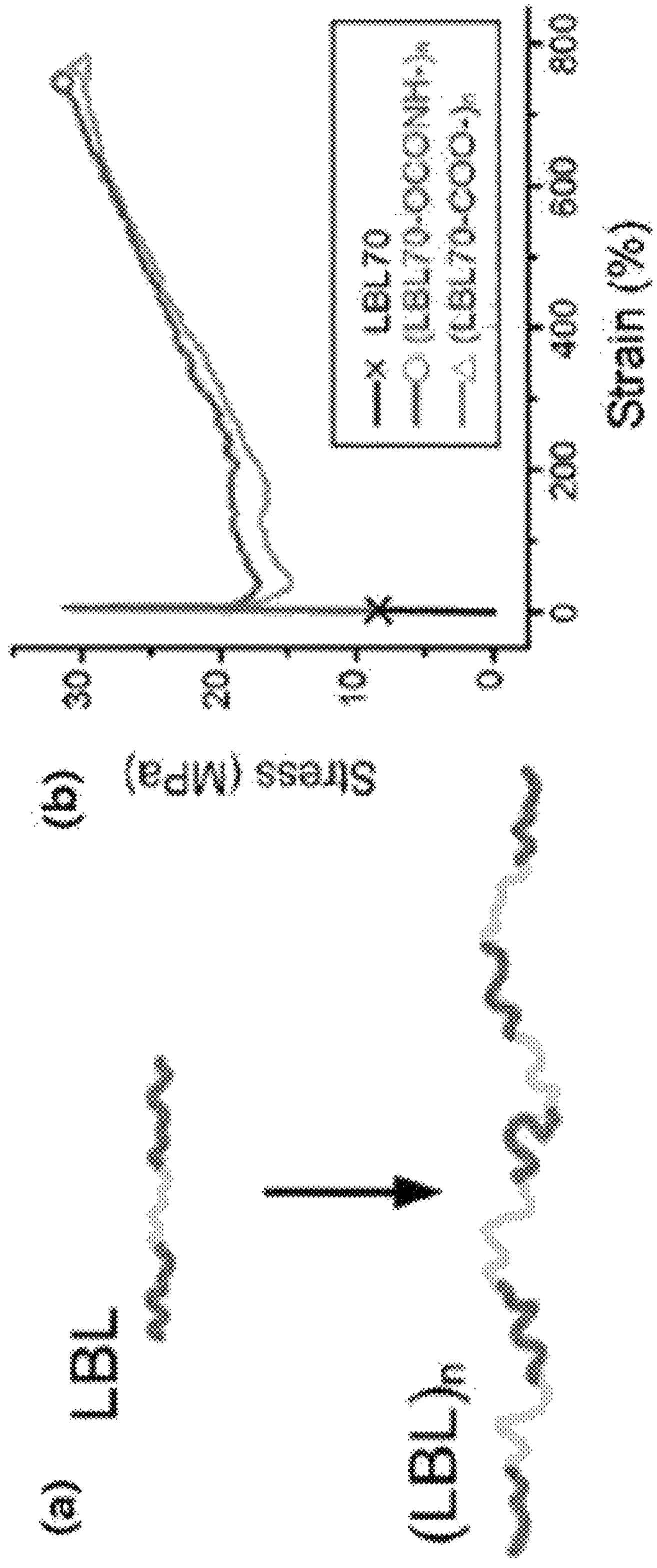
FIG. 9 illustrates physical properties of a polybutadiene-polylactide multiblock copolymer according to conventional toughening PLA technology in (a) and (b).

As a conventional toughening PLA technology, there was a method of implementing toughening PLA by preparing a polybutadiene-polylactide multiblock copolymer. FIG. 9 illustrates the physical properties of the polybutadiene-polylactide multiblock copolymer according to the conventional toughening PLA technology, which has a disadvantage of showing lower mechanical properties than commercial PLA in terms of Young's modulus and yield stress. In the present invention, the disadvantage of the conventional toughening PLA technology was complemented by implementing the toughening PLA while perfectly maintaining Young's modulus and yield stress compared to commercial PLA.

EXAMPLE

Hereinafter, the present invention will be described in detail with reference to Examples for specific description. However, Examples according to the present invention may be modified in various forms, and it is not interpreted that the scope of the present invention is limited to the following Examples. Examples of the present invention will be provided for more completely explaining the present invention to those skilled in the art.

[Preparation Example 1] Preparation of Polyamide 11 [$NH_2$-PA11-$NH_2$] Having Diamine End Group Polyamide 11 ($NH_2$-PA11-$NH_2$, that is, PA11) having a diamino end group was synthesized by bulk self-polycondensation of biomass-derived 11-aminoundecanoic acid (AUDA) and petroleum-based hexamethylene diamine (HMDA). A mixture of 11-AUDA (80 g, 397.40 mmol) and HMDA (1.39 g, 11.96 mmol) was charged at ambient temperature in a round bottom flask (500 mL) equipped with an overhead mechanical stirrer, an $N_2$ inlet and a distillation apparatus. Thereafter, a reactor was put in a hot oil bath and purged with $N_2$ while stirring for 30 minutes. The temperature was increased up to 250° C. under stirring, and the polycondensation was performed without any catalyst for 6 h with a continuous nitrogen flow (200 mL $min^{-1}$), until HMDA ($T_b$ 204° C.) of ca. 50% was evaporated and disappeared. After cooling, a reaction crude material was dissolved in N-methyl-2-pyrrolidone (NMP) (33% w/v) at 160° C., and precipitated in cold water to remove residual monomers and obtain a solid product. After repeating the purification process three times, the recovered PA11 was dried in a vacuum oven at 120° C. for 3 days (90-95% isolated yields). 1H NMR (400 MHZ, TFA-d) for PA11: δ 3.61 (t, $H_a$, the methylene protons (2H) adjacent to the amine of the amide units), δ 3.29 (m, $H_b$, the methylene protons (4H) of connected with terminal amine), δ 2.78 (t, $H_c$, the methylene protons (2H) at the α-position of amide units), δ 1.91-1.70 (m, the methylene protons (4H) of amide repeating units), and δ 1.56-1.32 (m, the methylene protons (12H) of amide repeating units).

[Preparation Example 2] Preparation of PLA-PA11-PLA Triblock Copolymer

For the (PA11-PLA)n multiblock, four types of HO-PLA-PA11-PLA-OH (i.e., PLA-PA11-PLA) triblock copolymers with $f_{PLA}$ (polylactide volume fraction) of 0.5, 0.6, 0.7, and 0.8 were synthesized. The triblock copolymers were synthesized by bulk ring-opening polymerization (ROP) of D,L-lactide with the diamine-terminated PA11 ($M_{n,NMR}$ 12 kmol$^{-1}$) prepared in Preparation Example 1 as a macroinitiator using ball milling. D,L-lactide (e.g., 16.05 g, 111.36 mmol for $f_{PLA}$0.7) and a PA11 midblock (5.0 g, 0.41 mmol) were filled into a ball milling reactor (250 mL) in a nitrogen-filled glove box, and added with stainless steel balls (25 mm D.×3 ea, 10 mm D.×10 ea).

The sealed reactor filled with nitrogen was taken to a mixer mill (Retsch MIXER MILL MM 500 NANO) and in order to cap or hydroxyl-functionalize the terminal diamine of PA11 with one lactide molecule, a ring-opening initiation step was performed under 30 Hz vibration for 10 minutes. Then, a $Sn(Oct)_2$ (66 mg, 0.16 mmol) catalyst was added to the reactor in the glove box, and an ROP growth step of residual lactide was continuously performed for 1 hour with 30 Hz vibration. The reaction was quenched by exposure to ambient air, diluted with HFIP/chloroform (50/50% v/v), and precipitated into cold methanol. After repeating the precipitation three times, the recovered triblocks (white solid) were dried at 120° C. in a vacuum oven for 1 day (80-85% isolated yields). $^1$H NMR (400 MHZ, TFA-d) for PLA-PA11-PLA triblock copolymers: δ 5.47 (m, $H_{d1}$, methine protons (1H) of PLA repeating units), δ 4.78 (m, $H_{e1}$, methine protons (2H) of the PLA end units connected with hydroxyl group), δ 3.61 (t, $H_a$, methylene protons (2H) adjacent to the amine of the amide units), δ 3.45 (m, $H_{b2}$, methylene protons (4H) beside an amide group connected with a PLA unit), δ 2.78 (t, $H_c$, methylene protons (2H) at the α-position of amide units) δ 1.95-1.60 (m, the methylene protons (4H) of amide repeating units and the methyl protons (3H) of PLA repeating units), and δ 1.54-1.32 (m, the methylene protons (12H) of amide repeating units).

[Preparation Example 3] Preparation of $(PA11-PLA)_n$ Multiblock Copolymer

A $(PA11-PLA)_n$ multiblock copolymers were prepared by self-coupling of α,ω-hydroxyl-terminated PLA-PA11-PLA triblock copolymers with $f_{PLA}$ of 0.5, 0.6, 0.7, and 0.8 using 4,4'-methylenebis(phenyl isocyanate) (MDI). In a nitrogen-filled glove box, a triblock with $f_{PLA}$ of 0.7 (2.0 g, 0.042 mmol), MDI (13 mg, 0.051 mmol) and $Sn(Oct)_2$ (17 mg, 0.042 mmol) were filled into a ball milling reactor (50 mL) and stainless steel balls (20 mm D.×2 ea) were added. The sealed reactor filled with nitrogen was transported to a mixer mill (Retsch MIXER MILL MM 400), and then a mechanochemical urethane coupling reaction was performed with 20 Hz vibration for 1 hour. The reaction was quenched by exposure to ambient air, diluted with HFIP/chloroform (50/50% v/v), and precipitated into cold methanol. After repeating the purification three times, the recovered multiblocks (gray solid) were dried at 120° C. in a vacuum oven for 1 day 1.5 (90-95% isolated yields). $^1$H NMR (400 MHZ, TFA-d) for $(PA11-PLA)_n$ multiblock copolymers: δ 7.26 (m, $H_g$, aromatic protons (8H) of MDI), δ 5.47 (m, $H_{d1}$, methine protons (1H) of PLA repeating units), δ 4.01 (m, $H_h$, methylene protons (2H) of MDI), δ 3.61 (t, $H_a$, methylene protons (2H) adjacent to the amine of the amide units), δ 3.45 (m, $H_{b2}$, methylene protons (4H) beside an amide group connected to a PLA unit), δ 2.78 (t, $H_c$, methylene protons (2H) at the α-position of amide units) δ 1.93-1.59 (m, the methylene protons (4H) of amide repeating units and the methyl protons (3H) of PLA repeating units), and δ 1.55-1.28 (m, the methylene protons (12H) of amide repeating units).

[Analysis Result]

Preparation of Multiblock Copolymer Composed of Poly (Amide 11) and Poly(Lactide)

A [poly(amide11)-block-poly(lactide)] n, that is, $(PA11-PLA)_n$ multiblock copolymer was prepared by using biomass-derived monomers 11-aminoundecanoic acid (11-AUDA) and D,L-lactide (LA) and petroleum-based hexamethylene diamine (HMDA) and by bulk self-condensation, bulk ring-opening polymerization (ROP) using mechanochemical ball milling and subsequent alcohol-isocyanate coupling reactions.

Figure 2:
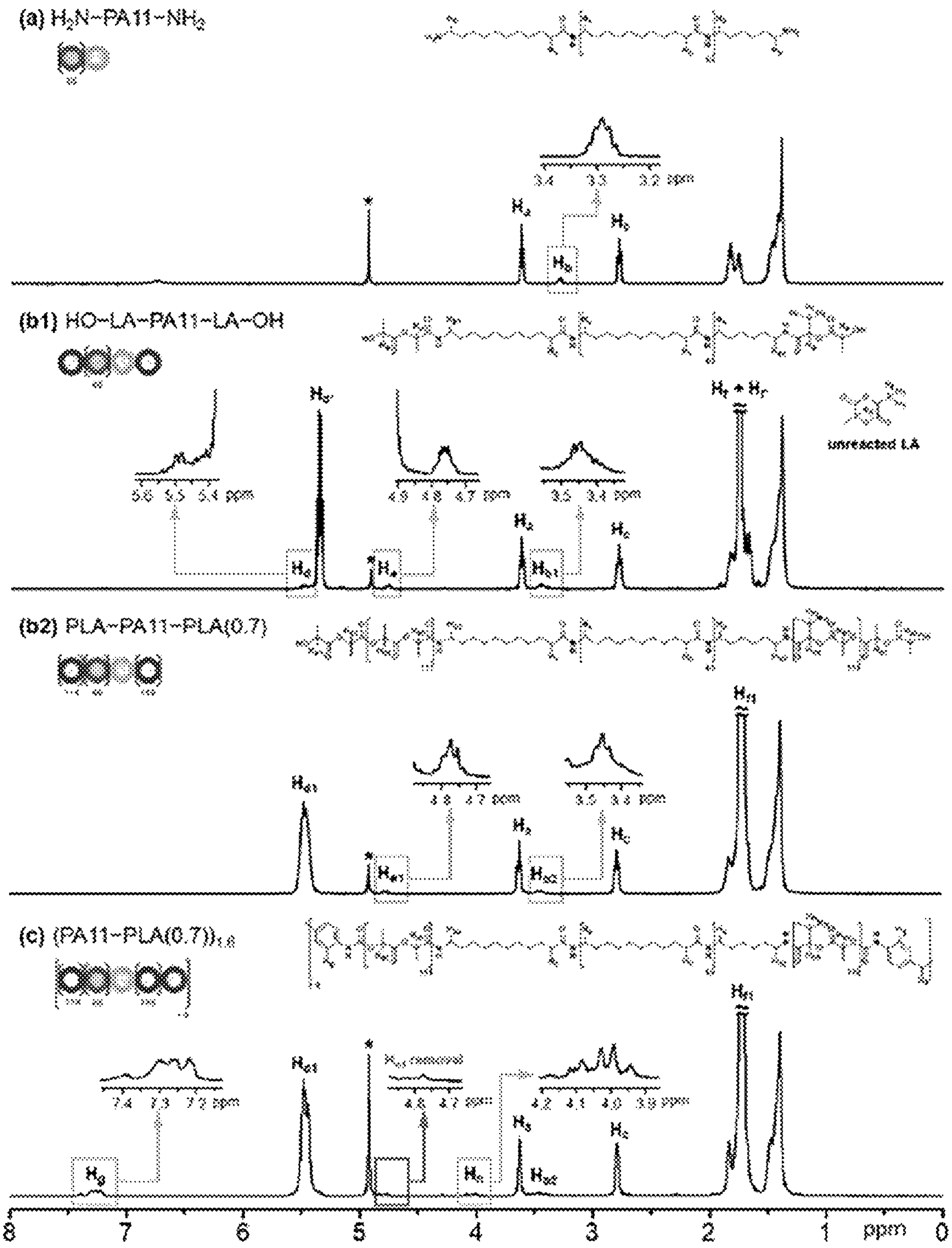
FIG. 2 illustrates $^1$H NMR spectra at TFA-d of (a) $H_2N$-PA11-$NH_2$, (b1) HO-LA-PA11-LA-OH, (b2) PLA-PA11-PLA (0.7), and (c) (PA11-PLA (0.7)) 1.6 according to an embodiment of the present invention.

First, a series of diamino-terminated PA11 samples as polyamide blocks in the multiblock copolymers were synthesized through the bulk self-condensation of 11-AUDA with varying amounts (1.5, 2.9, 4.8, 15, 23, and 36 mol %) of HMDA as a chain-reducing agent to target the molar masses of 12, 6.2, 3.8, 1.2, 0.7, and 0.4 kg mol$^{-1}$. For irreversible equilibration of the polycondensation, a continuous nitrogen flow (200 mL min$^{-1}$) was applied to remove by-product water, but simultaneously to induce HMDA blowing. This was also supported by sublimation, which occurred at a fairly high polymerization temperature (250° C.) and by the relatively low boiling condition of HMDA (204° C.). The resultant PA11 showed lower HMDA molar amounts of 0.9, 1.5, 3.3, 8.1, 16, and 21 mol % and higher molar masses of 22, 12, 5.4, 2.2, 1.1, and 0.8 kg mol$^{-1}$ than the theoretical weights calculated with the above-targeted molar ratios, which were determined by 1H NMR analysis using trifluoroacetic acid-d (TFA-d) (FIG. 2A).

Figure 3:
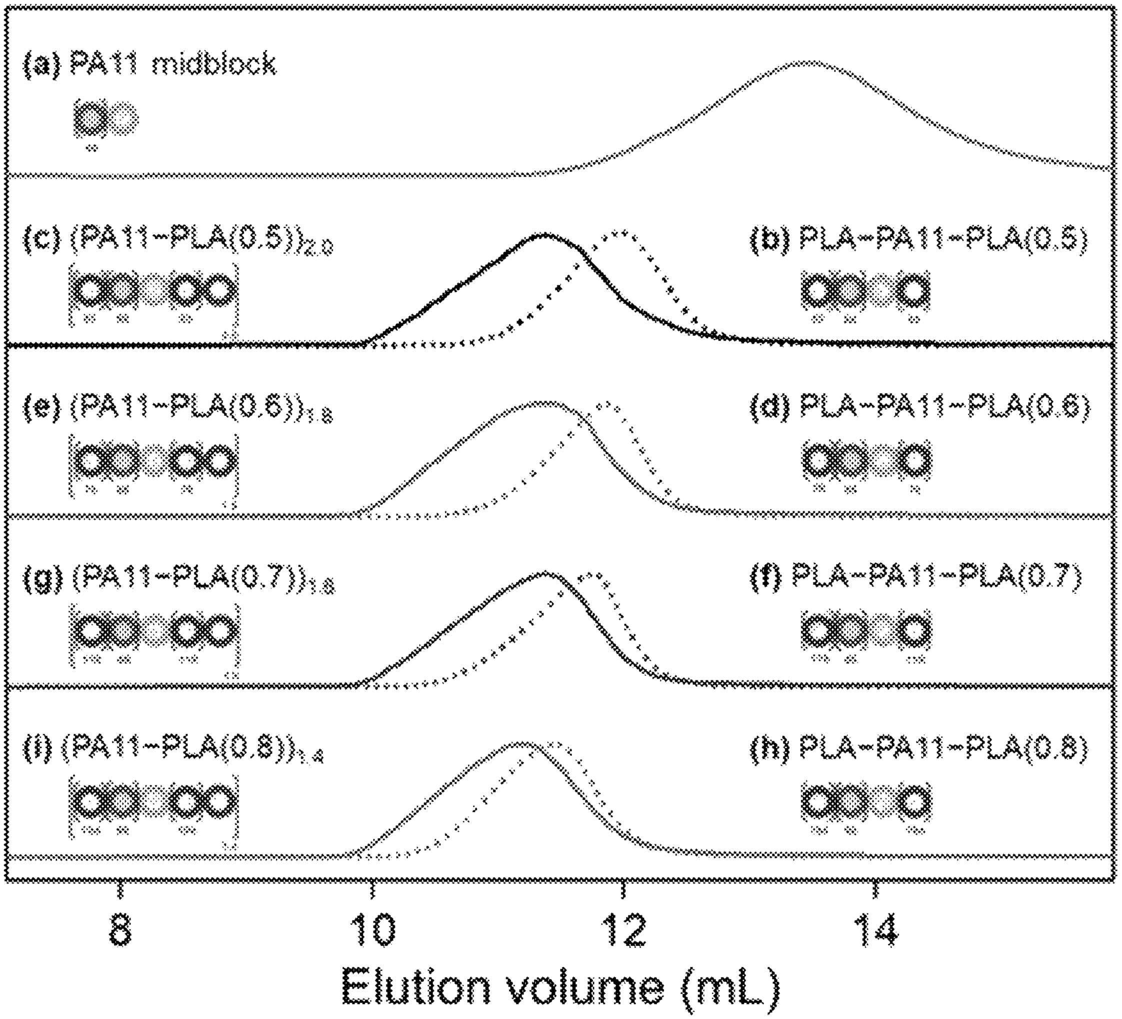
FIG. 3 illustrates size exclusion chromatography (SEC) data for copolymers of PA11 (a) PLA-PA11-PLA($f_{PLA}$) triblocks (b, d, f, h) and (PA11-PLA($f_{PLA}$))$_n$ multiblocks (c, e, g, i) according to an embodiment of the present invention.

In order to introduce an acceptable molar mass of PA11 as a semi-crystalline block in the (PA11-PLA)n multiblock copolymer synthesis and maximize the PLA toughening effect, PA11 with an $M_{n,NMR}$ value of 12 kg mol$^{-1}$ was selected (>99% conversion of AUDA, 95% segregated yield at 80 g scale and >99% bio-based carbon) (FIG. 10 and Table 1). The formation of the amide linkages was confirmed by two chemical shifts of methylene protons $H_a$ and $H_e$ at δ 3.61 and 2.78. The $M_{n,NMR}$ value of PA11 may be determined using a ratio of the methylene proton $H_a$ or $H_c$ to the methylene protons $H_b$ adjacent to the terminal amine of PA11 (FIG. 2A). Because the produced telechelic amino polyamide was barely soluble in the most widely used organic solvents such as tetrahydrofuran (THF), hexafluoroisopropanol (HFIP) containing 0.01 N sodium trifluoroacetate (NaTFA) capable of dissolving PA11 was used as an eluent for SEC analysis. The molar mass of PA11 ($M_{n,SEC}$=8.4 kg mol$^{-1}$) with a relatively reasonable polydispersity (Đ=1.9) was slightly lower than that obtained from $^1$H NMR analysis ($M_{n,NMR}$=12 kg mol$^{-1}$), and it was assumed due to a smaller hydrodynamic radius of PA11 in HFIP and a relative poly(methyl methacrylate) (PMMA) standard calibration curve in SEC studies (FIG. 3).

Second, in order to introduce a glassy PLA block into the $(PA11-PLA)_n$ multiblock copolymer, a poly(lactide)-block-poly(amide11)-block-poly(lactide) (PLA-PA11-PLA) triblock copolymer, composed of PA11 as an midblock and PLA as end blocks, was prepared using bulk ring-opening polymerization (ROP) through mechanochemical ball milling. The triblocks were prepared by an intermediate synthesis of PA11 amide end-capped LA without the addition of $Sn(Oct)_2$. This is because the insertion of LA into tin-nitrogen bonds is much slower than insertion of LA into tin-oxygen bonds, and thus, such synthesis may cause faster propagation (step ② in FIG. 10) than initiation (step ①in FIG. 10) and then uncontrolled PLA homo-polymerization. After complete conversion of $H_2N$-PA11-$NH_2$ to HO-LA-PA11-LA-OH, four types of PLA-PA11-PLA were prepared by sequential one-pot ball milling by adding a small amount of $Sn(Oct)_2$ for PLA propagation (>98% conversion rate, LA and 85-90% isolated yields at 20 g scale). The ratio of LA to one terminal hydroxyl unit of a HO-LA-PA11-LA-OH macroinitiator (including 58, 87, 136 and 232:1) was selected to design $M_{n,theo}$ values of 8.2, 12, 19 and 31 kg $mol^{-1}$ for one PLA block, hereafter referred as PLA-PA11-PLA (0.5, 0.6, 0.7, 0.8), respectively (Table 1). $^1H$ NMR spectroscopy [FIG. 2 (B1)] result showed complete LA end-capping to $H_2N$-PA11-$NH_2$ through ROP initiated by amine, resulting in HO-LA-PA11-LA-OH, as determined by the chemical peaks at δ 4.78 and 5.48 of the methine protons ($H_e$ and $H_d$) adjacent to the terminal hydroxyl and the amide linkage, respectively, with an integral ratio of 1:1. The resonance of methylene protons ($H_b$) at δ 3.29 beside to terminal amine of PA11 was also moved to δ 3.45 ($H_{b1}$). It was confirmed that only one LA monomer was amidated from the terminal amine of the macroinitiator even though excess LA was added to the amine-initiation step. After additionally introducing $Sn(Oct)_2$, the excess LA was continuously propagated from the produced telechelic hydroxyl-macroinitiator. This was verified by the fact that the chemical shifts of methine protons ($H_{e1}$ and $H_{b2}$) next to the terminal hydroxyl of the PLA end-block and amide group connected with the PLA still existed at δ 4.78 and 3.45, respectively, and the peak of the methine proton ($H_{d1}$) at δ 5.46 in the PLA repeating units intensively increased (FIG. 2 (B2)). The ratios of methine protons Hel and $H_{d1}$ were used to determine the $M_{n,NMR}$ values of 7.7-12-7.7, Nov. 12, 2011, 17-12-17, and 28-12-28 kg $mol^{-1}$ and the PLA volume fractions ($f_{PLA}$) of 0.5, 0.6, 0.7, and 0.8 based on the densities of the homopolymers ($\beta_{PLA}$=1.24 and $\beta_{PA11}$=1.03) meaning well-controlled production of PLA-PA11-PLA triblocks containing>99% bio-based carbon (FIG. 10 and Table 1). Compared to the PA11 macroinitiator, the SEC traces of PLA-PA11-PLA of 0.5, 0.6, 0.7, and 0.8 were clearly shifted to higher molar masses of 47, 58, 72 and 95 kg $mol^{-1}$, and contained higher PLA molar masses with an increasing PLA volume fraction (Table 1, FIG. 3). The controlled polymerization of LA showed that the dispersities of the triblock (D=1.3-1.5) was much lower than that of PA11 (D=1.9), proving all-initiated PA11 and no PLA homopolymer.

In order to completely connect glassy PLA blocks in the (PA11-PLA)n multiblock copolymer, self-coupling α,ω-hydroxyl terminated PLA-PA11-PLA triblock copolymer was achieved using 4,4'-methylenebis(phenyl isocyanate) (MDI) as a coupling reagent and $Sn(Oct)_2$ as a catalyst in a ball milling system. The ratio of hydroxyl (—OH) to isocyanate (—NCO) was fixed at 1:1.2 to facilitate the contact between the triblock terminus and MDI in the vibratory ball mill to obtain multiblocks with sufficient molar masses for PLA toughening. This is the first approach to synthesize a multiblock copolymer by forming urethane bonds between hydroxyl-terminated triblock copolymers based on mechanochemical reactions at ambient temperature (90-95% isolated yield and to 97% bio-based carbon) (FIG. 10). It is well known that a bulk polyamide (PA) process requires an operating temperature of 180° C. or higher and there may be transesterification reactions in the presence of $Sn(Oct)_2$ in a melt process. In addition, a polymerization method using a solvent to prepare a copolymer containing PA is limited in practice due to the low solubility of PA in most common organic solvents. Four multiblocks with $f_{PLA}$ of 0.5, 0.6, 0.7, and 0.8 were prepared and the molecular properties were listed in Table 1.

The methine peak $H_{e1}$ next to the terminal hydroxyl of the triblock disappeared, but resonances of an aromatic ring proton $H_g$ and a methylene proton $H_h$ of MDI integrated into the multiblock were observed together at δ 7.26 and δ 4.01 (FIG. 2C). The SEC chromatograms for the four synthesized (PA11-PLA), multiblocks exhibited significantly higher molar masses (95, 106, 115 and 133 kg $mol^{-1}$) with slightly broader polydispersities (D=1.9-2.1) than the triblocks. This confirms that the self-coupling of PLA-PA11-PLA through ball milling was well carried out without any chain scissioning and the calculation of the average numbers of the triblocks (n=1.4-2.0) per the one multiblock chain was reasonable based on the ratios of $M_{n,SEC}$ values between the multiblocks and the triblock precursors (Table 1 and FIG. 3).

TABLE 1

| Polymer | $[M]_0/[I]_0$ | $M_{n,target}$ (kg $mol^{-1}$) | Conv. (%) | $M_{n,theo}$ (kg $mol^{-1}$)[i] | $M_{n,NMR}$ (kg $mol^{-1}$)[j] | $M_{n,SEC}$ (kg $mol^{-1}$) (Đ)[l] | $f_{PLA}$[m] | n | $T_g$ (° C.)[q] | $T_m$ (° C.)[p] | $X_{polymer}$[r]/ $X_{PA11}$[s] (%,$_{DSC}$) | $T_{d,5\%}$ (° C.)[t] | D (nm)[u] |
|---|---|---|---|---|---|---|---|---|---|---|---|---|---|
| midblock | | | | | | | | | | | | | |
| PA11 | 33[b] | 6.2 | >99/58[f] | 12 | 12 | 8.4 (1.9) | | | 40-60 | 188 | 28 | 410 | |
| PLA-PA11-PLA triblocks | | | | | | | | | | | | | |
| PLA-PA11-PLA(0.5) | 58[c] | 8.4-12-8.4[c] | 98[g] | 8.2-12-8.2 | 7.7-12-7.7 | 47 (1.3) | 0.5 | 1.0[n] | 48[q] | 186 | 13/26 | 233 | 27 |
| PLA-PA11-PLA(0.6) | 87[c] | 13-12-13[c] | 94[g] | 12-12-12 | 11-12-11 | 58 (1.3) | 0.6 | 1.0[n] | 49[q] | 184 | 11/28 | 235 | 28 |
| PLA-PA11-PLA(0.7) | 136[c] | 20-12-20[c] | 95[g] | 19-12-19 | 17-12-17 | 72 (1.4) | 0.7 | 1.0[n] | 53[q] | 182 | 7.0/24 | 238 | 32 |
| PLA-PA11-PLA(0.8) | 232[c] | 33-12-33[c] | 92[g] | 31-12-31 | 28-12-28 | 95 (1.5) | 0.8 | 1.0[n] | 54q | 183 | 4.4/22 | 235 | 33 |
| $(PA11-PLA)_n$ multiblocks | | | | | | | | | | | | | |
| $(PA11-PLA(0.5))_{2.0}$ | 1.2[d] | | 90[h] | | 56[k] | 95 (2.0) | 0.5 | 2.0[n] | 48[q] | 185 | 13/26 | 252 | 29 |
| $(PA11-PLA(0.6))_{1.8}$ | 1.2[d] | | 95[h] | | 62[k] | 106 (2.1) | 0.6 | 1.8[n] | 51[q] | 186 | 10/25 | 248 | 30 |

TABLE 1-continued

| Polymer | $[M]_0/[I]_0$ | $M_{n,target}$ (kg $mol^{-1}$) | Conv. (%) | $M_{n,theo}$ (kg $mol^{-1}$)[i] | $M_{n,NMR}$ (kg $mol^{-1}$)[j] | $M_{n,SEC}$ (kg $mol^{-1}$) (Đ)[l] | $f_{PLA}$[m] | n | $T_g$ (° C.)[q] | $T_m$ (° C.)[p] | $X_{polymer}$[r]/ $X_{PA11}$[s] (%,$_{DSC}$) | $T_{d,5\%}$ (° C.)[t] | D (nm)[u] |
|---|---|---|---|---|---|---|---|---|---|---|---|---|---|
| $(PA11\text{-}PLA(0.7))_{1.6}$ | 1.2[d] | | 93[h] | | 75[k] | 115 (1.9) | 0.7 | 1.6[n] | 53[q] | 184 | 7.1/24 | 261 | 35 |
| $(PA11\text{-}PLA(0.8))_{1.4}$ | 1.2[d] | | 91[h] | | 96[k] | 133 (2.0) | 0.8 | 1.4[n] | 56[q] | 183 | 3.8/20 | 255 | 36 |

[b]M and I indicate 11-AUDA and HMDA momomer.
[c]M and I indicate D,L-lactide (LA) monomer and one terminal hydroxyl unit of HO-LA-PA11-LA-OH.
[d]M and I indicate 4,4'-methylenebis(phenyl isocyanate) (MDI) and α,ω-hydroxyl terminated PLA-PA11-PLA triblock copolymer.
[e]A-B-A values indicate the targeted $M_n$ values for PLA-PA11-PLA triblock copolymers.
[f]Conversions of AUDA and HMDA for preparing PA11.
[g]Conversion of D,L-lactide for producing PLA-PA11-PLA triblock based on. mechanochemical ball milling process (20 g scale).
[h]Isolated yields of multiblocks through precipitation.
[i]Theoretical molar masses of PA11 midblock and PLA end-blocks based on the conversions of 11-AUDA/HMDA and LA monomers by $^1H$ NMR analysis.
[j]Calculated by the integration ratios of the repeating units of the PLA side chains using $^1H$ NMR analysis, plus PA11 molar mass of 12 kg $mol^{-1}$.
[k]Determined by multiplying the $M_{n,NMR}$ values of the triblock copolymers by n.
[l]Determined by size-exclusion chromatography (SEC) in hexafluoroisopropanol (HFIP) with 0.01N sodium trifluoroacetate (NaTFA) relative to poly(methyl methacrylate) standards.
[m]Volume fractions of PLA calculated using the densities of the PA11 and PLA homopolymers ($\rho_{PA11}$ = 1.03 and $\rho_{PLA}$ = 1.24).
[n]Average number of (PLA-PA11-PLA) units in the triblock copolymers.
[o]Average number of triblocks in the multiblock based on the ratio of the $M_{n,SEC}$ values corresponding to the triblocks and the multiblocks.
[p]Determined by the second heating cycle of differential scanning calorimetry (DSC) at 10° C. $min^{-1}$ under nitrogen.
[q]Tg value of PLA block in the triblock and multiblock, because the PA11 block in the triblock and multiblock homopolymer might have a relatively weak and broad $T_g$ range around 40-60° C., which was overlapped with that of PLA.
[r]Crystallinity (%) based on the theoretical heat of fusion ($\Delta H_f$) calculated by 100% crystallinity of PA11 (i.e., $\Delta H_f^o$ = 189.05 J $g^{-1}$)
[s]Normalized PA11 crystallinity ($X_{PA11}$) calculated with $X_{polymer}$ and the molar mass fraction of PA11 block in the multiblock.
[t]5% weight loss ($T_{d,5\%}$) estimated by thermogravimetric analysis (TGA, 10° C. $min^{-1}$ under nitrogen).
[u]Principal domain spacing of the bulk triblock and multiblock samples evaluated by SAXS analysis (25° C.).

Thermal Characteristics

Figure 4:
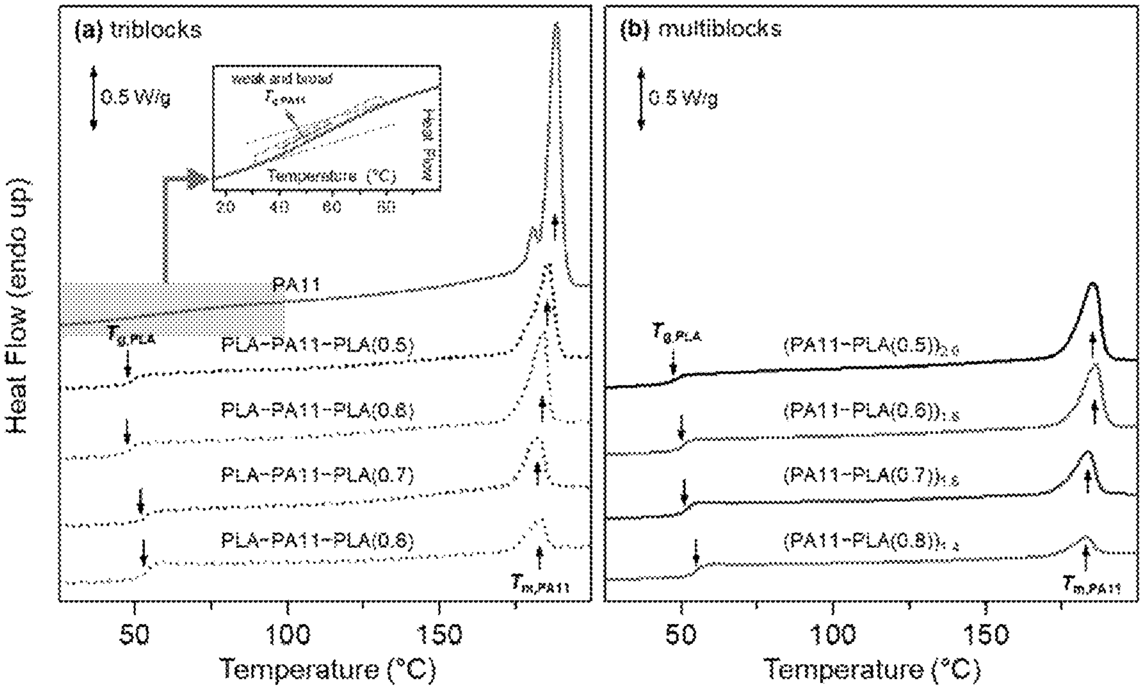
FIG. 4 illustrates differential scanning calorimetry (DSC) results of (a) PA11, PLA-PA11-PLA($f_{PLA}$) triblock, and (b) (PA11-PLA($f_{PLA}$))$_n$ multiblock copolymers according to an embodiment of the present invention. Arrows indicate a glass transition temperature $T_g$ of glassy PLA and a melting temperature $T_m$ of a semi-crystalline PA11 microdomain.

The thermal characteristics of the PA11 midblock, the PLA-PA11-PLA triblocks and the (PA11-PLA)n multiblocks, such as glass transition and melting transition temperatures $T_g$ and $T_m$, were characterized by differential scanning calorimetry (DSC) [FIGS. 4A and 4B]. The PA11 homopolymer exhibited a relatively weak and broad $T_g$ range around 40 to 60° C., but only one clear $T_g$ of the PLA segments in the triblocks and multiblocks was observed at 48 to 56° C. Since it was well known that PLA and PA11 were thermodynamically immiscible, and the two transitions are in close proximity, the weak $T_g$ range of PA11 overlapped to seem to disappear due to the apparent and single $T_g$ of PLA, but evidence of phase-separation between PA11 and PLA in the triblocks and multiblocks was confirmed by the presence of one clear $T_m$ peak at 182 to 186° C. As the PLA chain length increased from 7.7 to 28 kg $mol^{-1}$ with $f_{PLA}$ from 0.5 to 0.8, the $T_g$ of the PLA block shifted to a higher temperature from 48 to 56° C. and the crystallinity $X_{polymer}$ of the triblocks and multiblocks decreased from 13% to 4% (Table 1). The normalized crystallinities $X_{PA11}$ of the PA11 blocks were similar or slightly decreased to 28-20%, compared to that of PA11 (28%). This indicated that the amorphous PLA segment did not significantly hinder the crystallization of the linked PA11 (Table 12), and there was proposed a possible strengthening effect for the PLA-based copolymer. The thermal stability of PA11, triblocks and multiblocks were determined by thermogravimetric analysis (TGA) in a nitrogen atmosphere, and the decomposition temperature was shown at 5% weight loss Ta, 5% (Table 1). Considering neat PA11 (12 kg $mol^{-1}$) for semi-crystalline blocks and PLA (15 and 50 kg $mol^{-1}$) for glassy blocks (Ta, 5%=410 and 230° C., respectively), the triblocks exhibited a decreased thermal stability (Ta, 5%=233 to 238° C.) regardless of the amount of PLA($f_{PLA}$=0.5-0.8). This is because thermal decomposition occurred due to random cleavage of aliphatic ester structures in a relatively shortened PLA block (7.7 to 28 kg $mol^{-1}$) with terminal hydroxyl groups easily exposed to $Sn(Oct)_2$ as a transesterification-depolymerization catalyst. Third, after forming the urethane linkage was formed in the third ball milling step, $(PA11\text{-}PLA)_n$ had a slightly higher $T_{d,5}$% value of about 248-261° C. This may be caused to the reduced amount of terminal hydroxyl groups and longer chains of multiple blocks. It also indicated that there were still the first and second transitions expected by the PLA and PA11 blocks in the multiple blocks at 267 to 288° C. and 455 to 466° C., respectively. The amide group of PA11 may participate in hydrogen bonding, which may limit chain migration and thus cause high $T_m$ and excellent mechanical properties.

Dynamic Mechanical Characteristics

Figure 5:
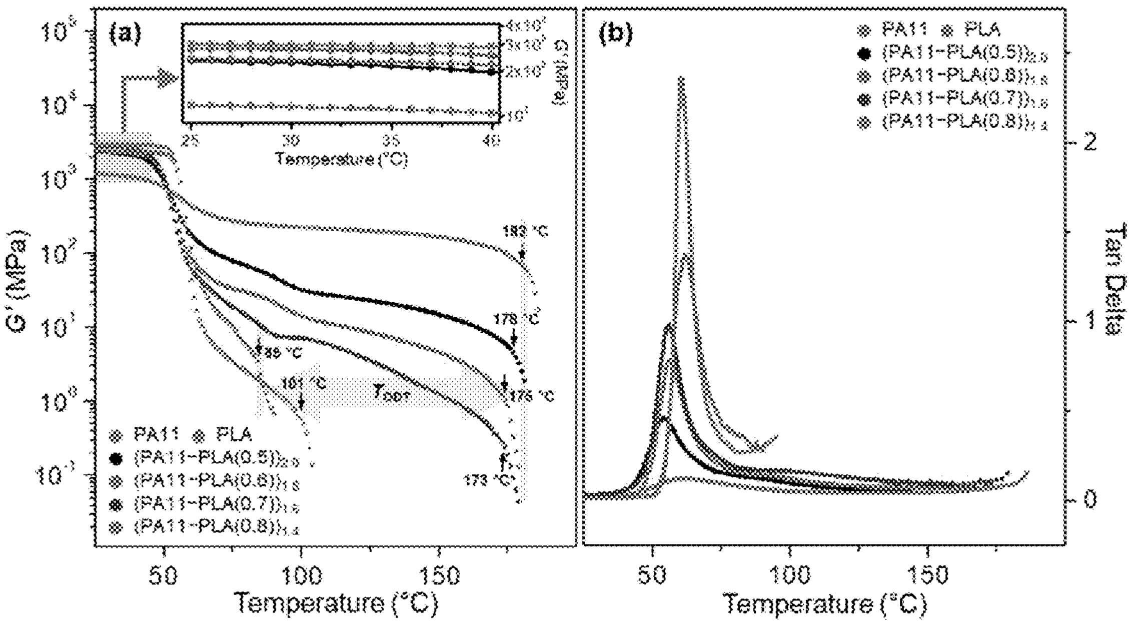
FIG. 5 illustrates (a) a viscoelastic property (storage modulus, G') and (b) tan δ (ratio of loss modulus (G") to storage modulus (G')) of a homopolymer of PA11/PLA (Rilsan® BMNO/NatureWorks® Ingeo™ 4060D) and (PA11-PLA)$_n$ multiblock copolymer as a function of temperature from 25 to 187° C. at a frequency of 1 Hz at a strain rate of 0.05% and a ramp rate (torsion mode) of 5° C. $min^{-1}$ according to an embodiment of the present invention [Inset of (a): including plateau and high modulus (G') at ambient temperature (25 to 40° C.)].

A dynamic mechanical analysis (DMA) in torsion mode was used to determine the phase separated structure and the thermoplastic properties of the (PA11-PLA)n multiblocks, including the transitions of storage modulus (G') and the sharp peaks in tan § (=G"/G') as temperature increased at a rate of 3° C. $min^{-1}$ at a frequency of 1 Hz [FIGS. 5A and 5B]. The G' values of all multiblocks remained constant within the range of 2.3-2.7×$10^3$ MPa below about 25-40° C., which was quite similar to that of PLA (2.9×$10^3$ MPa), and was more than twice as high as that of PA11 (1.2× $10^3$ MPa) (inset of FIG. 5A). It may be suggested that the mechanical properties of the multiblocks may be similar to a tensile behavior of PLA, depending on G' with increasing. This may also mean that PLA segments in the multiblock behave as a hard phase in a temperature range. A first thermal transition of the PLA and PA11 blocks showed a distinct drop in G' from about 41 to 70° C. [FIG. 5C] and a sharp drop of the tan δ peak at about 54 to 62° C. [FIG. 5B]. As already discussed in the DSC result [FIG. 4B], the transition of the PA11 block appeared to be merged with that of PLA to cause a single transition in the temperature range. A steady decrease at the plateau of the storage modulus was lasted up to ca. 175° C., and thereafter, a significant decrease was shown in the case of $(PA11\text{-}PLA\ (0.5))_{2.0}$, $(PA11\text{-}PLA\ (0.6))_{1.8}$, and $(PA11\text{-}PLA\ (0.7))_{1.6}$. A sharp decrease in the plateau of $(PA11\text{-}PLA\ (0.8))_{1.4}$ was observed at 85° C., which was similar to that of the PLA homopolymer (FIG. 5A). This may be directly linked to an order-to-disorder transition ($T_{ODT}$) leading to PA11 domain disruption and a thermoplastic behavior of the $(PA11\text{-}PLA)_n$ multiblock. However, since the $T_{ODT}$ values were found slightly earlier than their $T_m$ values (183 to 186° C.) mentioned in the DSC result, additional studies are needed to explain a correlation between $T_{ODT}$ and $T_m$. Interestingly, as $f_{PLA}$ increased from 0.5 to 0.8, the slope of the first transition and the tan & value gradually increased, and the G' level of the plateau gradually decreased in the temperature range after 41 to 70° C. It can be concluded that the PLA block serves as a soft phase and the PA11 segment with a high $T_m$ acts as a relatively hard domain in the multiblock after the first transition temperature, even though PA11 and PLA have comparable $T_g$ values as mentioned above.

PA11-PLA Flory-Huggins γ Interaction Parameters

The behavior of dissimilar components microphase-separated into ordered morphologies in block copolymers was determined by the total number of repeating units (N), the volume percentage of each component (f), and the interaction parameter between the two segments in various architectures (χ). The temperature dependent x value is expressed by the following Equation 1:

$$\chi(T) = \frac{\alpha}{T} + \beta \quad \text{[Equation 1]}$$

where, α is an excess enthalpic coefficient and β is an excess entropic coefficient. The PA11-PLA Flory-Huggins χ interaction parameter was measured using $T_{ODT}$ values observed by DMA in a torsion mode of the PLA-PA11-PLA triblocks with three different molar masses 7.7-12-7.7, Dec. 17, 2012 and 16-24-16 kg $mol^{-1}$ and an $f_{PLA}$ of 0.5. The degree of polymerization N could be calculated based on the ambient temperature densities of PA11 and PLA homopolymers (1.03 and 1.24 g $cm^{-3}$, respectively) with a standard reference volume of 71.1 $cm^3$ $mol^{-1}$ (118 $A^3$ per repeat unit), resulting in the N values of 335, 496 and 699 for the three triblocks. According to the mean-field theory, a lamellar position in the order-to-disorder transition of compositionally symmetric ABA triblocks may be predicted at $(\chi^N)_{ODT}$=17.996. Considering the factors obtained from the triblock copolymer, the temperature dependence of χ between PA11 and PLA was described by Equation 2 below.

$$\chi_{PA11\text{-}PLA} = \frac{(426.00 \pm 4.81)}{T} - (0.90 \pm 0.01) \quad \text{[Equation 2]}$$

For comparison with the literature on common block copolymer systems having $\chi_{PLA\text{-}PB}$=0.21 and 0.17, $\chi_{PLA\text{-}PDL}$32 0.11 and 0.10, χPLA-PCHE=0.31 and 0.25, $\chi_{PLA\text{-}PDMS}$=1.18 and 1.08, $\chi_{PLA\text{-}PMCL}$=0.06 and 0.05, $\chi_{PLA\text{-}PS}$=0.15 and 0.13, $\chi_{PS\text{-}PMMA}$=0.04 and 0.04, $\chi_{PS\text{-}PDHS}$=0.78 and 0.73, $\chi_{PCL\text{-}PB}$=0.17 and 0.15, $\chi_{P3HS\text{-}PDMS}$=0.40 and 0.39 at 100 and 140° C., $\chi_{PA11\text{-}PLA}$ values were calculated to be 0.24 and 0.13 [PB=polybutadiene, PDL=Poly(ε-decalactone), PCHE=poly(cyclohexylethylene), PDMS=poly(dimethylsiloxane), PMCL=poly(6-methyl-ε-caprolactone), PS=polystyrene, PMMA=poly(methyl methacrylate), PDHS=poly(3,4-dihydroxystyrene), PCL=polycaprolactone, P3HS=poly(3-hydroxystyrene)]. This was a first complete approach to investigate the Flory-Huggins χ interaction parameter of PA11-PLA, each of which has been used as a commodity plastic.

Morphology

Figure 6:
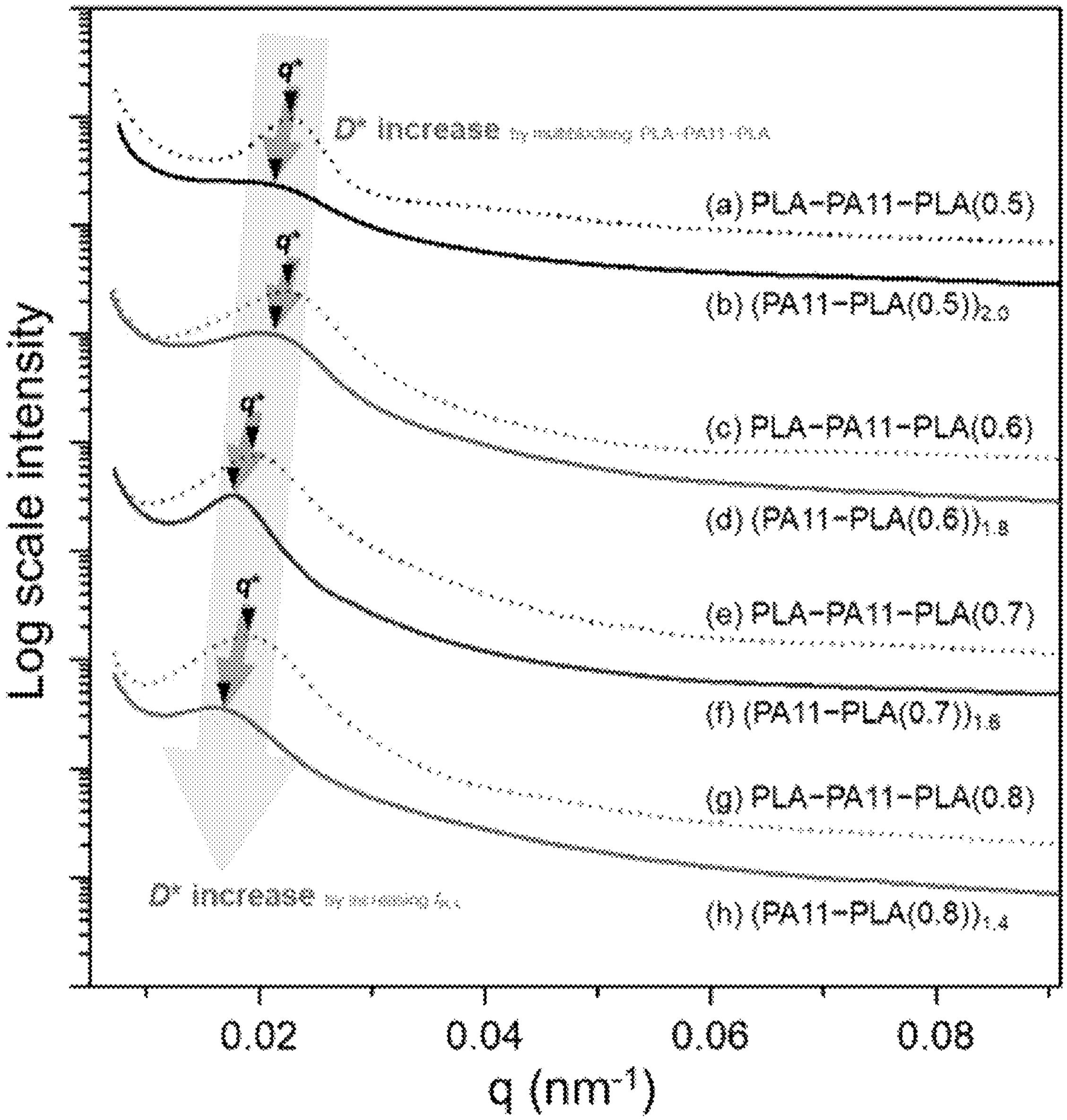
FIG. 6 illustrates SAXS profiles at 25° C. for PLA-PA11-PLA($f_{PLA}$) triblock copolymer (dashed line) and (PA11-PLA ($f_{PLA}$))$_n$ multiblock copolymer (solid line) according to an embodiment of the present invention [arrows (▼) indicate main reflections (q*) at low scattering angles].

The nanophase-separated structures of the bulk PLA-PA11-PLA triblocks and the $(PA11\text{-}PLA)_n$ multiblocks were confirmed using small-angle X-ray scattering (SAXS) at room temperature (FIG. 6). A broad single principal reflection q* was observed at low scattering angles, indicating that a nanophase-separated morphology occurred. Unfortunately, it was not possible to identify a definitive assignment of the higher order scattering oscillations due to the broad basal reflections after a low q* region. Through the presence of a PA11 crystalline phase evidenced by DSC traces (FIGS. 4A and 4B), it may be proposed that the formation of higher order structures in the triblocks and multiblocks was interrupted. Since all of the block copolymers were prepared using the PA11 blocks of the same length ($M_{n,PA11}$=12 kg $mol^{-1}$), the principal domain spacing values (D) slightly increased from 27 to 33 nm in triblocks and increased from 29 to 36 nm in multiblocks with increasing $f_{PLA}$ (Table 12). Compared to the triblocks, the D values of the multiblocks with higher n increased slightly in the range of 7 to 9% (Table 12, FIG. 6). In addition, it may be described that the segregation strength increased by n causes a greater degree of chain stretching, and then a larger D, finally resulting in a higher $T_{ODT}$. Therefore, it can be suggested that the segregation strength for (PA11-PLA (0.5)) 2.0 ($M_n$=95 kg $mol^{-1}$, D=2.9, $T_{ODT}$=178° C., FIG. 5A) is higher than that of PLA-PA11-PLA (0.5) ($M_n$=47 kg $mol^{-1}$, D=2.7, $T_{ODT}$=172° C.).

TABLE 2

| polymers | | $T_{ODT}$ (° C.)[f] | Storage modulus, G' (at 25/70° C.) ($\times 10^3$, MPa)[f] | Young's modulus, E (MPa)[g] | yield stress, $\sigma_{yield}$ (MPa)[g] | stress at break, $\sigma_b$ (MPa)[g] | strain at break, $\varepsilon_b$ (%)[g] | toughness, γ (MJ $m^{-3}$)[g] | $X_{polymer}$ (initial/stretched) ($\%_{,XRD}$)[h] |
|---|---|---|---|---|---|---|---|---|---|
| references for PLA and PA11 blocks in the multiblocks | | | | | | | | | |
| PLA | Ingeo™ 4060D (98)[b] | 101 | 3.0/0.01 | 920 ± 12 | 61 ± 2 | 60 ± 2 | 9 ± 1 | 4 ± 2 | |
| | as-prepared (15)[c] | | | 268 ± 11 | 5 ± 1 | | 2 ± 1 | 0.4 ± 0.2 | |
| | as-prepared (50)[c] | | | 736 ± 15 | 23 ± 3 | 23 ± 3 | 3 ± 1 | 2 ± 1 | |
| PA11 | Rilsan® BMNO (50)[d] | 182 | 1.2/0.30 | 434 ± 8 | 41 ± 1 | 49 ± 3 | 428 ± 50 | 168 ± 20 | 23/30 |
| | as-prepared (12)[e] | | | 281 ± 20 | 38 ± 1 | 30 ± 1 | 80 ± 15 | 26 ± 2 | |
| $(PA11\text{-}PLA)_n$ multiblocks | | | | | | | | | |
| $(PA11\text{-}PLA(0.5))_{2.0}$ | | 178 | 2.3/0.09 | 758 ± 32 | 51 ± 1 | 41 ± 3 | 380 ± 66 | 128 ± 22 | 18/31 |
| $(PA11\text{-}PLA(0.6))_{1.8}$ | | 175 | 2.4/0.04 | 733 ± 50 | 50 ± 1 | 40 ± 4 | 395 ± 49 | 124 ± 18 | 14/29 |

TABLE 2-continued

| polymers | $T_{ODT}$ (° C.)[f] | Storage modulus, G' (at 25/70° C.) (×10³, MPa)[f] | Young's modulus, E (MPa)[g] | yield stress, $\sigma_{yield}$ (MPa)[g] | stress at break, $\sigma_b$ (MPa)[g] | strain at break, $\varepsilon_b$ (%)[g] | toughness, $\gamma$ (MJ m$^{-3}$)[g] | $X_{polymer}$ (initial/stretched) (%,$_{XRD}$)[h] |
|---|---|---|---|---|---|---|---|---|
| $(PA11-PLA(0.7))_{1.6}$ | 173 | 2.4/0.03 | 804 ± 54 | 57 ± 2 | 47 ± 3 | 493 ± 48 | 171 ± 25 | 10/21 |
| $(PA11-PLA(0.8))_{1.4}$ | 85 | 2.7/0.02 | 903 ± 55 | 63 ± 3 | 51 ± 4 | 346 ± 26 | 137 ± 19 | 5/11 |

[b]Ingeo™ 4060D is an amorphous PLA product from Nature Works LLC and (98) means the $M_{n,sec}$ value of 98 kg mol$^{-1}$.

[c]As-prepared (15) and (50) indicate amorphous PLA homopolymers with $M_{n,NMR}$ = 15 and 50 kg mol$^{-1}$ for this study, which was similar to the molar masses of a PLA block in $(PA11-PLA(0.5\ and\ 0.8))_{2.0\ and\ 1.4}$.

[d]Rilsan® BMNO is a semicrystalline PA11 product from Arkema and (50) means the $M_w$ value of 50 kg mol$^{-1}$.

[e]As-prepared (12) indicates a semicrystalline PA11 homopolymer with $M_{n,NMR}$ = 12 kg mol$^{-1}$ for this study, which was similar to the molar mass of a PA11 block incorporated in all the multiblocks.

[f]Performed by dynamic mechanical analysis (DMA) in torsion mode.

[g]Measured by tensile testing on ASTM D1708 standard.

[h]Determined by X-ray diffraction (XRD) analysis for Ingeo™ 4060D, Rilsan® BMNO, and the multiblock samples before and after stretching.

Mechanical Properties

Figure 7:
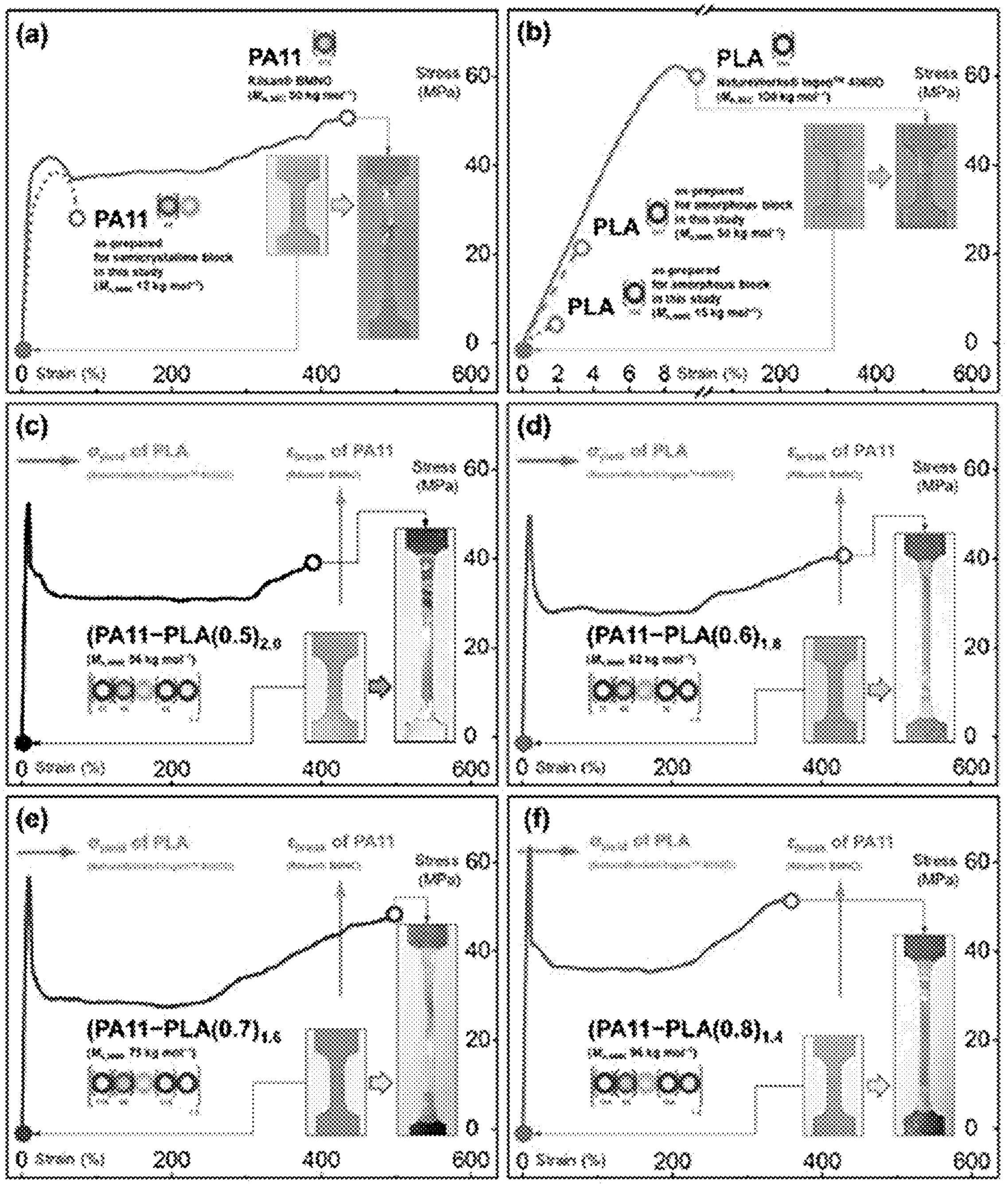
FIG. 7 illustrates stress-strain curves for (a) PA11 such as Rilsan® BMNO and PA11 prepared with 12 kg $mol^{-1}$ of $M_{n,NMR}$ prepared in an embodiment of the present invention, (b) PLA such as Nature Works® Ingeo™ 4060D and PLA polymerized with 50 and 15 kg $mol^{-1}$ of $M_{n,NMR}$, and (c-f) (PA11-PLA($f_{PLA}$))$_n$ [including sample photos before and after tensile testing (inset)].
Figure 8:
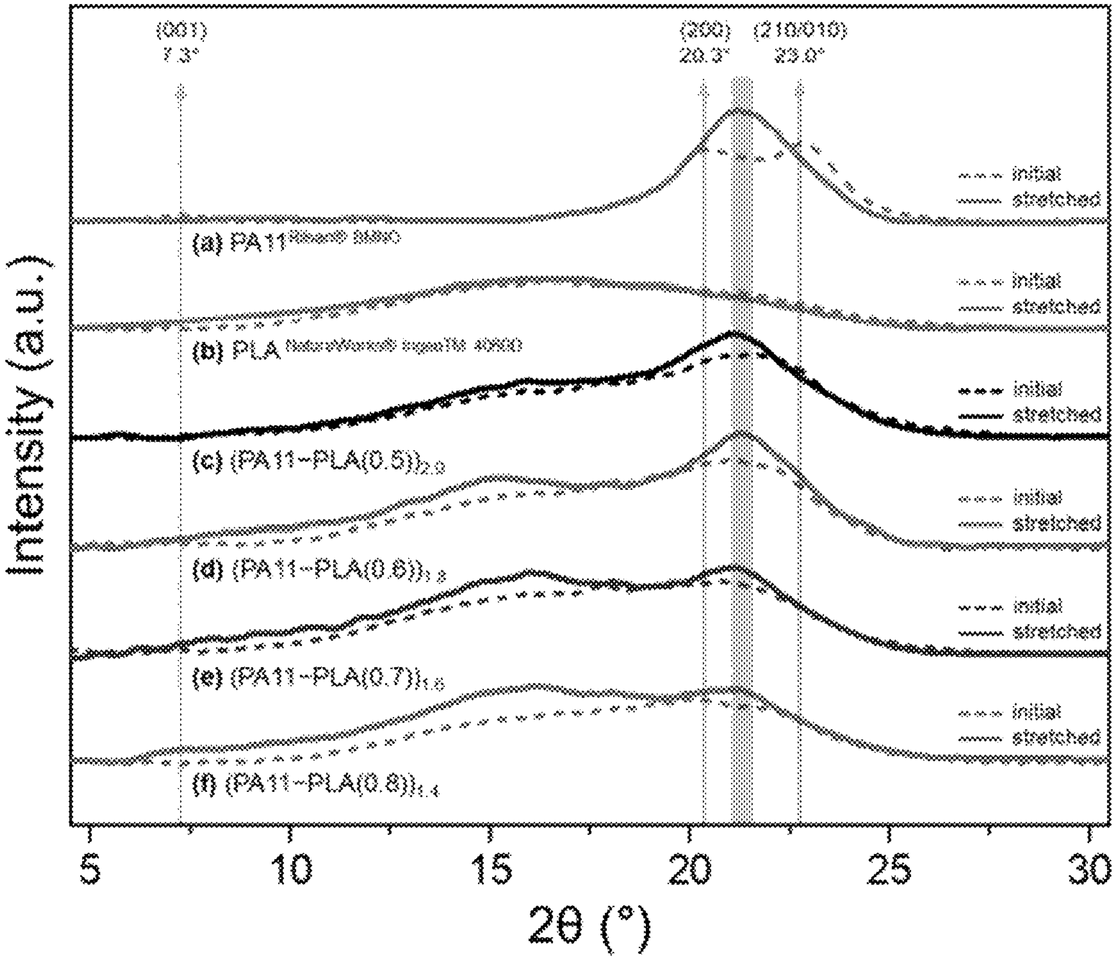
FIG. 8 illustrates XRD patterns according to tensile tests before and after stretching (a) PA11 (Rilsan® BMNO), (b) PLA (NatureWorks® Ingeo™4060D), and (c-f) (PA11-PLA ($f_{PLA}$))$_n$ according to an embodiment of the present invention [The diffraction peaks at 2θ=7.3°, 20.3° and 23.0° are caused by a' crystals of PA11. It is assumed that a' crystals are gradually deformed into (pseudo) hexagonal δ crystals after stretching (indicated by a light green highlight in a vertical direction)].

To evaluate the mechanical properties of a (PA11-PLA), multiblock copolymer, a dog bone-shaped specimen was prepared by performing compression molding around $T_m$ (to 190° C.) of PA11 and then cooling at ambient temperature, that is, below $T_g$ of PLA (50 to 60° C.). It was elongated with constant crosshead speed (50 mm min$^{-1}$) during uniaxial tensile testing. The tensile data of glassy PLA including two samples prepared for this study ($M_{n,NMR}$=15 and 50 kg mol$^{-1}$) and a commercial product ($M_{n,SEC}$=98 kg mol$^{-1}$), 15 semi-crystalline PA11 ($M_{n,NMR}$=12 kg mol$^{-1}$) including the specimens polymerized for this operation, an industrial product ($M_{w,SEC}$=50 kg mol$^{-1}$) and multiblocks were disclosed in Table 23 along with stress-strain plots (FIG. 7). glassy PLA and semi-crystalline PA11 obtained from the market exhibited general brittleness characteristics (E=920 MPa, $\sigma_{yield}$=61 MPa, $\sigma_b$=60 MPa, $\varepsilon_b$=9%, $\gamma$=4 MJ m$^{-3}$) and ductility including strain hardening (E=434 MPa, $\sigma_{yield}$=41 MPa, $\sigma_b$=49 MPa, $\varepsilon_b$=428%, $\gamma$=168 MJ m$^{-3}$). However, as-prepared PA11 and PLA homopolymers exhibited relatively similar but inferior properties due to the aforementioned lower molar mass [FIGS. 7A and 7B]. It was hypothesized that the hard and ductile behaviors of the multiblocks may be caused by inherent glassy and semi-crystalline properties in PLA and PA11, which was reasonable according to the results already observed in a DMA curve in the ambient temperature range. As a result, multiblocks with $f_{PLA}$ of 0.5 to 0.8 demonstrated greatly reinforced tensile properties combined with the initial hardness of the glassy PLA, and a lasting ductility with subsequent strain-hardening of the semicrystalline PA11 [FIGS. 7C 7D, 7E, and 7F]. Under low elongation (<10%), the linear responses between the strain of the X-axis and the stress of the Y-axis in the S-S curve were found, and the resulting E values gradually increased from 758 to 903 MPa with increasing $f_{PLA}$, which was finally close to that of commercial PLA (920 MPa). More interestingly, the $\sigma_{yield}$ of the multiblock tended to increase from 50 to 63 MPa with increasing $f_{PLA}$. In particular, (PA11-PLA (0.7)) 1.6 and $(PA11-PLA\ (0.8))_{1.4}$ exhibited strength values of 57 and 63 MPa, similar to or slightly superior to Nature Works® Ingeo™ 4060D (61 MPa). In addition, the multiblocks exhibited ductility and toughness, including plateau stress of 28 to 37 MPa for $\varepsilon_b$ of 200 to 250%, rather than brittle behavior after initial stress (E=758 to 903 MPa) and yield stress ($\sigma_{yield}$=57 to 63 MPa), and even obvious strain-hardening up to stress ($\sigma_b$) and strain ($\varepsilon_b$) at break of 40-51 MPa and of 380-493%, which was could also be represented as work to fracture ($\gamma$=124 to 171 MJ m$^{-3}$). Unlike hard rubber multiblock copolymer systems, multiblocks in which semi-crystalline PA11 and glassy PLA act as the soft and hard phases, respectively, have slightly reduced or similar E and strain roughness ($\gamma$) increased significantly according to strain hardening (124 to 171 MJ m$^{-3}$). This may be described as follows. (1) A glassy-semicrystalline PCHE-PE-PCHE-PE-PCHE (CECEC) pentablock copolymer (PCHE or C=poly(cyclohexylethylene); PE or E=poly(ethylene)) with a lamellar microstructure (WPCHE=0.56) did not show brittle fracture, but showed improved ductility with strain hardening. This may be because a highly entangled PE domain linked by a PCHE midblock chain effectively increased a network density of the pentablock and then prevent crack formation in a core PCHE block to finally result in a brittle-ductile transition. (2) Additionally, comparing the CEC triblock with the CECEC pentablock, it may be described that the proportion of glassy C chain ends decreases and the proportion of the intermediate segments with C and E blocks increases to impede crack propagation with low brittleness. (3) It has been reported that a multiple nanoscale domain network formed through bridges enhances linkage and subsequent physical crosslinking in multiblocks results in improved or superior tensile properties, including ductile behavior and strain hardening. (4) In the $(PA11-PLA)_n$ multiblock copolymer, the excellent $\sigma_{yield}$ was expressed in a dynamic form of intramolecular and intermolecular hydrogen bondings of ester and amide groups between PLA and PA11, ester and ester groups of PLA itself, and the amide-amide groups of PA11 itself (Table 1). (5) This may be verified even by X-ray diffraction (XRD) analysis of tensile specimens before and after stress of PLA, PA11 and multiblocks (FIG. 8). Amorphous PLA (NatureWorks® Ingeo™ 4060D) did not show specific crystalline peaks at 2θ=14.7°, 16.6°, 18.9° and 22.3° as observed for semi-crystalline PLLA. Semi-crystalline PA11 (Rilsan® BMNO) exhibits specific reflections at 2θ=7.3°, 20.3° and 23.0° representing (001), (200) and (210/010) planes, respectively. After stretching of the PA11 homopolymer, the three planes disappeared and only one reflection newly appeared at 2θ=21.2°. As the two main diffraction reflections at 2θ=20.3° and 23.0° were steadily close to each other, a merged behavior a was merged into a single peak. This was previously reported as the Brill transition, which corresponds to the gradual transformation of a triclinic lattice into a (pseudo) hexagonal lattice despite a high temperature (100° C.). The two reflections at 2θ=20.3° and 23.0° were not clearly shown before stretching, but compared to commercial PA11 (50 kg mol$^{-1}$), due to the relatively low molar mass (12 kg mol$^{-1}$) of the PA11 block in the multiblocks, the stretched multiblock specimen exhibited a clear single peak by the Brill transition and showed higher crystallinity (11 to 31%) than an unstretched specimen (5 to 18%) (Table 2 and FIG. 8). Since the PA11 chains of multiblocks were oriented in the same direction during stretching, the enhanced crystallinity may induce the PLA strengthening effect. $(PA11\text{-}PLA)_n$ demonstrated long-lasting ductility including strain hardening with stretching up to 63 MPa beyond increased yield stress [FIGS. 7C, 7D, 7E, and 7F]. In addition, other reflection intensities around 10.8 to 18.5° gradually increased as $f_{PLA}$ increased from 0.5 to 0.8. Increased PLA amorphous regions in multiblocks may enhance mechanical performance, including toughening with strain-hardening.

A series of multiblock copolymers consisting of amorphous PLA produced by D,L-lactide (LA) and semi-crystalline PA11 produced by hexamethylene diamine (HMDA) and reproducible 11-aminoundecanoic acid (11-AUDA) have been developed to achieve superior mechanical properties that perfectly reproduce the initial modulus and lasting ductility with subsequent strain-hardening. First, amine-terminated PA11 ($H_2N\text{-}PA11\text{-}NH_2$) was prepared by bulk self-condensation and then capped with LA without a catalyst through mechanochemical ball milling to be converted to HO-LA-PA11-LA-OH. After introducing a small amount of $Sn(Oct)_2$, unreacted LA was rapidly propagated to prepare PLA-PA11-PLA triblocks with $f_{PLA}$ of 0.5 to 0.8, based on the controlled ROP. Here, the terminal hydroxyl groups were subsequently coupled with a diisocyanate reagent to finally prepare $(PA11\text{-}PLA)_n$ multiblocks by ball milling. Molecular properties of the triblocks and multiblocks were studied by $^1H$ NMR and SEC. Thermal analysis including DSC, DMA and TGA determined the phase separation between PA11 and PLA based on $T_{g,PLA}$ and $T_{m,\ PA11}$, and demonstrated that there are two transitions to thermal degradation ($T_d$). The SAXS profiles of the triblocks and multiblocks also confirmed the microphase-separated morphology. The PA11-PLA $\chi$ interaction parameter may be calculated using $T_{ODT}$ values obtained from DMA of the three PLA-PA11-PLA triblock copolymers with $f_{PLA}$ of 0.5. A multiblock covalently linked by the triblocks displayed impressive tensile behaviors, still having their initial modulus and additionally showing toughness, even with stain-hardening, compared to the fragile precursor triblocks. This may be attributed to the formation of PLA phase bridged by PA11 and the enhanced crystallinity of the PA11 block in the multiblock after stretching, which was confirmed by comparing the XRD patterns. Interestingly, the mechanical behaviors of the multiblocks were exactly similar with what to merge those of each commercial PLA and PA11. Through the excellent mechanical behavior of the semicrystalline-glassy $(PA11\text{-}PLA)_n$ multiblocks, it may be confirmed that a sustainable approach of the present invention is effective to prepare tough PLA.

So far, specific embodiments of the multiblock copolymer containing PLA and PA for toughening PLA according to an embodiment of the present invention and the method for preparing the same have been described, but it is obvious that various modifications are possible within the limits without deviating from the scope of the present invention.

Therefore, the scope of the present invention should not be limited to the exemplary embodiments and should be defined by the appended claims and equivalents to the appended claims.

In other words, the exemplary embodiments described above are illustrative in all aspects and should be understood as not being restrictive, and the scope of the present invention is represented by appended claims to be described below rather than the detailed description, and it is to be interpreted that the meaning and scope of the appended claims and all changed or modified forms derived from the equivalents thereof are included within the scope of the present invention.

What is claimed is:

1. A polyamide 11-polylactide multiblock copolymer represented by the following Formula 1:

[Formula 1]

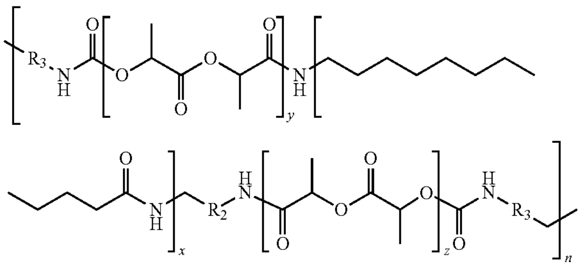

In Formula 1, R2 is selected from C1-C20 straight-chain or branched-chain alkylene, C3-C20 cycloalkylene, C6-C20 arylene,

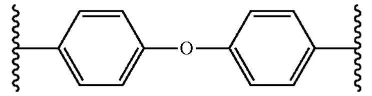

or

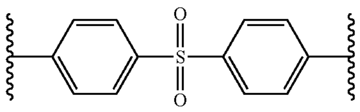

,

R3 is selected from C1-C20 straight-chain or branched-chain alkylene, C3-C20 cycloalkylene, or C6-C20 arylene, x is an integer of 1 to 200, y and z are the same as or different from each other and integers of 1 to 500, and n is an integer of 1 to 10.

2. The polyamide 11-polylactide multiblock copolymer of claim 1, wherein the polyamide 11-polylactide multiblock copolymer is prepared by urethane bonding of diisocyanate to hydroxyl telechelic polylactide-polyamide 11-polylactide [OH-PLA-PA11-PLA-OH] prepared by ring-opening polymerization of lactide with a polyamide 11 [$NH_2$-PA11-$NH_2$] having a diamine end group.

3. The polyamide 11-polylactide multiblock copolymer of claim 2, wherein the polyamide 11 [$NH_2$-PA11-$NH_2$] having the diamine end group is prepared by polycondensation of an 11-amino undecanoic acid derivative of Formula 2 below and diamine of Formula 3 below:

[Formula 2]

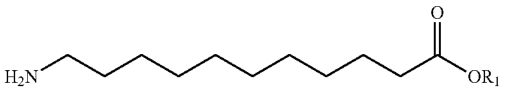

In Formula 2, $R_1$ is selected from H or a C1-C10 straight-chain, branched-chain or cyclic alkyl group, or a C6-C10 aryl group or a C7-C10 aralkyl group,

[Formula 3]

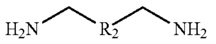

In Formula 3, R2 is selected from C1-C20 straight-chain or branched-chain alkylene, C3-C20 cycloalkylene, C6-C20 arylene,

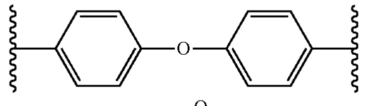

or

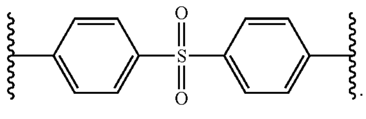

4. The polyamide 11-polylactide multiblock copolymer of claim 2, wherein the polyamide 11 [$NH_2$-PA11-$NH_2$] having the diamine end group is represented by Formula 4 below:

[Formula 4]

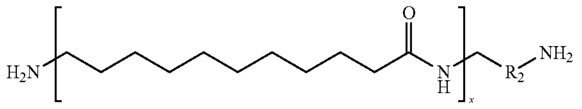

In Formula 4, R2 is selected from C1-C20 straight-chain or branched-chain alkylene, C3-C20 cycloalkylene, C6-C20 arylene,

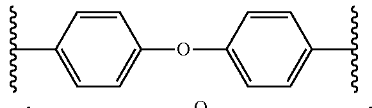

or

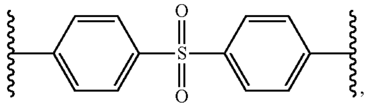

and x is an integer of 1 to 200.

5. The polyamide 11-polylactide multiblock copolymer of claim 2, wherein the hydroxyl telechelic polylactide-polyamide 11-polylactide [OH-PLA-PA11-PLA-OH] is represented by Formula 5 below:

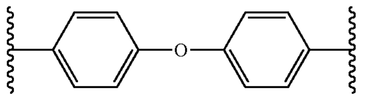

or

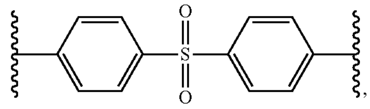

x is an integer of 1 to 200, and y and z are the same as or different from each other and are integers of 1 to 500.

6. The polyamide 11-polylactide multiblock copolymer of claim 2, wherein the diisocyanate is represented by Formula 6 below:

[Formula 6]

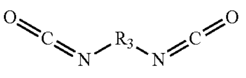

In Formula 6, $R_3$ is selected from C1-C20 straight-chain or branched-chain alkylene, C3-C20 cycloalkylene, and C6-C20 arylene.

7. A molded article comprising the polyamide 11-polylactide multiblock copolymer of claim 1.

8. A method for preparing a polyamide 11-polylactide multiblock copolymer comprising:

(a) preparing polyamide 11 [NH2-PA11-NH2] having a diamine end group;

(b) preparing hydroxyl telechelic polylactide-polyamide 11-polylactide [OH-PLA-PA11-PLA-OH] by adding lactide to the polyamide 11 [NH2-PA11-NH2] having the diamine end group and performing ring-opening polymerization; and (c) preparing a polyamide 11-polylactide multiblock copolymer [(PA11-PLA)n, wherein n is an integer of 1 to 10 by adding diisocyanate to the hydroxyl telechelic polylactide-polyamide 11-polylactide [OH-PLA-PA11-PLA-OH] and forming a urethane bond.

9. The method for preparing the polyamide 11-polylactide multiblock copolymer of claim 8, wherein the polyamide 11 [$NH_2$-PA11-$NH_2$] having the diamine end group in step (a) is prepared by polycondensation of a polyamide 11 amino undecanoic acid derivative and diamine.

10. The method for preparing the polyamide 11-polylactide multiblock copolymer of claim 8, wherein step (b) comprises (b-1) reacting lactide with a diamine-terminated polyamide 11 ($H_2N$-PA11-$NH_2$) to form a hydroxyl telechelic lactide-polyamide 11-lactide intermediate [HO-LA-PA11-LA-OH] by an initial ring-opening polymerization; and

[Formula 5]

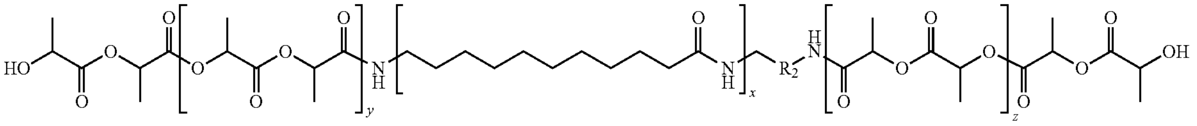

In Formula 5, $R_2$ is selected from C1-C20 straight-chain or branched-chain alkylene, C3-C20 cycloalkylene, C6-C20 arylene, (b-2) performing ring-opening polymerization of lactide from the hydroxyl telechelic lactide-polyamide 11-lactide intermediate [HO-LA-PA11-LA-OH] to form a hydroxyl telechelic polylactide-polyamide 11-polylactide [OH-PLA-PA11-PLA-OH], wherein step (b-1) is performed prior to step (b-2).

11. The method for preparing the polyamide 11-polylactide multiblock copolymer of claim 10, wherein steps (b-1) and (b-2) are performed by a mechanochemical method.

12. The method for preparing the polyamide 11-polylactide multiblock copolymer of claim 10, wherein in step (b-2), $Sn(Oct)_2$ is used as a catalyst.

13. The method for preparing the polyamide 11-polylactide multiblock copolymer of claim 8, wherein step (c) is performed by a mechanochemical method.

* * * * *